(12) United States Patent
Smith et al.

(10) Patent No.: US 9,917,430 B2
(45) Date of Patent: Mar. 13, 2018

(54) ACTIVE COVER PLATES

(71) Applicants: Jeremy Smith, Orem, UT (US);
Martin Johnson, Draper, UT (US);
Phil Dietz, St. George, UT (US);
Darren Knight, Lindon, UT (US)

(72) Inventors: Jeremy Smith, Orem, UT (US);
Martin Johnson, Draper, UT (US);
Phil Dietz, St. George, UT (US);
Darren Knight, Lindon, UT (US)

(73) Assignee: Snap Rays, Vineyard, UT (US)

(*) Notice: Subject to any disclaimer, the term of this patent is extended or adjusted under 35 U.S.C. 154(b) by 0 days.

(21) Appl. No.: 15/486,280

(22) Filed: Apr. 12, 2017

(65) Prior Publication Data
US 2017/0222417 A1 Aug. 3, 2017

Related U.S. Application Data

(63) Continuation-in-part of application No. 15/428,099, filed on Feb. 8, 2017, which is a continuation-in-part
(Continued)

(51) Int. Cl.
H05B 33/00 (2006.01)
H02G 3/14 (2006.01)
(Continued)

(52) U.S. Cl.
CPC ............ *H02G 3/14* (2013.01); *H01R 13/665* (2013.01); *H01R 25/006* (2013.01); *H02B 1/46* (2013.01);
(Continued)

(58) Field of Classification Search
CPC ............ H05B 37/0218; H05B 33/0842; H01H 9/0271; H01H 13/04; H01H 21/04;
(Continued)

(56) References Cited

U.S. PATENT DOCUMENTS 2,015,698 A 10/1935 Tiffany
2,227,549 A 1/1941 McNeill
(Continued)

FOREIGN PATENT DOCUMENTS

CA 2732657 8/2012
DE 202006006354 10/2007
(Continued)

OTHER PUBLICATIONS

Plate Pals Wallplate Thermometers, http://www.platepals.com/ last visited Apr. 21, 2017, 2006.
(Continued)

Primary Examiner — Pete Lee

(57) ABSTRACT

In one example, a cover plate may include a face plate with at least one outlet aperture, a back plate abutting the back of the face plate, an electric load between the face plate and the back plate, and at least one prong that extends from the face plate to a free end. The prong may be configured to interface with a terminal on the side of an outlet receptacle body and may include any or all of the following: an insulated portion and/or an electrical contact. The prong may resiliently deflects outward when interfacing with the terminal and may deflect with a first resistance prior to contacting a wall and with a second resistance that is greater than the first resistance when the prong contacts the wall. The cover play may also include at least one conductor electrically connecting the prong to the electric load.

23 Claims, 16 Drawing Sheets

Related U.S. Application Data of application No. 15/409,508, filed on Jan. 18, 2017, now Pat. No. 9,807,829, application No. 15/486,280, which is a continuation-in-part of application No. 15/406,404, filed on Jan. 13, 2017, now Pat. No. 9,742,111, which is a continuation-in-part of application No. 15/145,749, filed on May 3, 2016, now Pat. No. 9,787,025, which is a continuation-in-part of application No. 14/549,143, filed on Nov. 20, 2014, now Pat. No. 9,362,728, which is a continuation-in-part of application No. 14/066,621, filed on Oct. 29, 2013, now Pat. No. 9,035,180, which is a continuation-in-part of application No. 13/461,915, filed on May 2, 2012, now Pat. No. 8,912,442, application No. 15/486,280, which is a continuation-in-part of application No. 14/678,746, filed on Apr. 3, 2015, now Pat. No. 9,768,562, which is a continuation of application No. 14/066,637, filed on Oct. 29, 2013, now Pat. No. 9,035,181, which is a continuation-in-part of application No. 13/461,915.

(60) Provisional application No. 62/279,831, filed on Jan. 18, 2016, provisional application No. 61/574,344, filed on Aug. 1, 2011, provisional application No. 61/720,131, filed on Oct. 30, 2012, provisional application No. 61/778,386, filed on Mar. 12, 2013, provisional application No. 61/836,972, filed on Jun. 19, 2013, provisional application No. 61/906,651, filed on Nov. 20, 2013, provisional application No. 62/027,784, filed on Jul. 23, 2014, provisional application No. 62/081,539, filed on Nov. 18, 2014.

(51) Int. Cl.
| | |
|---|---|
| *H02G 3/18* | (2006.01) |
| *H02G 3/08* | (2006.01) |
| *H01R 25/00* | (2006.01) |
| *H01R 13/66* | (2006.01) |
| *H02B 1/46* | (2006.01) |
| *H05B 33/08* | (2006.01) |
| *H05B 37/02* | (2006.01) |
| *H01R 103/00* | (2006.01) |

(52) U.S. Cl.
CPC ............. *H02G 3/081* (2013.01); *H02G 3/18* (2013.01); *H05B 33/0842* (2013.01); *H05B 37/0218* (2013.01); *H01R 2103/00* (2013.01)

(58) Field of Classification Search
CPC .......... H01H 9/0264; H02B 1/46; H02G 3/10; H02G 3/12; H02G 3/16; H02G 3/20; H02G 3/086; H02G 3/14; H02G 3/081; H01R 13/44; H01R 13/665; H01R 2103/00
See application file for complete search history.

(56) References Cited

U.S. PATENT DOCUMENTS

| | | | |
|---|---|---|---|
| 2,385,620 A | 9/1945 | Fleckenstein | |
| 2,428,167 A | 9/1947 | Linton | |
| 2,515,820 A | 7/1950 | Clark | |
| 2,575,820 A | 11/1951 | Linton | |
| 2,580,056 A | 12/1951 | Wheeler, Jr. | |
| 2,749,381 A | 6/1956 | Farish | |
| 2,880,285 A | 3/1959 | Robison et al. | |
| 2,908,743 A | 10/1959 | Premoshis | |
| 2,934,590 A | 4/1960 | Thompson, et al. | |
| 3,120,414 A | 2/1964 | Farish, Jr. | |
| 3,307,030 A | 2/1967 | Francisco | |
| D212,760 S | 11/1968 | Bordner | |
| 3,522,595 A | 8/1970 | White | |
| 3,588,489 A | 6/1971 | Gaines | |
| 3,680,237 A | 8/1972 | Finnerty, Sr. | |
| 3,739,226 A | 6/1973 | Seiter et al. | |
| 3,859,454 A | 1/1975 | Mann | |
| 3,879,101 A | 4/1975 | McKissic | |
| 4,000,405 A | 12/1976 | Horwinski | |
| 4,038,582 A | 7/1977 | Horwinski | |
| 4,117,258 A | 9/1978 | Shanker | |
| 4,255,780 A | 3/1981 | Sakellaris | |
| 4,282,591 A | 8/1981 | Andreuccetti | |
| 4,514,789 A | 4/1985 | Jester | |
| 4,534,486 A | 8/1985 | Eidson | |
| 4,546,419 A | 10/1985 | Johnson | |
| 4,611,264 A | 9/1986 | Bradley | |
| 4,616,285 A | 10/1986 | Sackett | |
| 4,617,613 A | 10/1986 | Rice | |
| 4,755,913 A | 7/1988 | Sleveland | |
| 4,774,641 A | 9/1988 | Rice | |
| D330,267 S | 10/1992 | Hendrix | |
| 5,248,919 A | 9/1993 | Hanna | |
| D230,274 S | 2/1994 | Polus | |
| 5,290,175 A | 3/1994 | Robinson | |
| 5,384,428 A | 1/1995 | Luu | |
| 5,406,439 A | 4/1995 | Crane et al. | |
| 5,473,517 A | 12/1995 | Blackman | |
| D366,339 S | 1/1996 | Waller | |
| 5,481,442 A | 1/1996 | Dickie et al. | |
| 5,485,356 A | 1/1996 | Nguyen | |
| 5,622,424 A | 4/1997 | Brady | |
| 5,660,459 A | 8/1997 | Appelberg | |
| 5,670,776 A * | 9/1997 | Rothbaum | F21S 8/035 250/214 AL |
| 5,683,166 A | 11/1997 | Lutzker | |
| D395,314 S | 6/1998 | Oikawa | |
| D399,825 S | 10/1998 | Heung et al. | |
| 5,816,682 A | 10/1998 | Marischen | |
| D401,566 S | 11/1998 | Gesmondi | |
| 5,833,350 A | 11/1998 | Moreland | |
| D407,072 S | 3/1999 | Gaule | |
| 5,914,826 A | 6/1999 | Smallwood | |
| 6,000,807 A | 12/1999 | Moreland | |
| 6,010,228 A | 1/2000 | Blackman | |
| 6,023,021 A | 2/2000 | Matthews et al. | |
| 6,087,588 A | 7/2000 | Soules | |
| 6,089,893 A | 7/2000 | Yu et al. | |
| D429,829 S | 8/2000 | Doran | |
| 6,390,647 B1 | 5/2002 | Shaefer | |
| 6,423,900 B1 | 7/2002 | Soules | |
| D464,865 S | 10/2002 | Luu | |
| 6,457,843 B1 | 10/2002 | Kesler et al. | |
| D473,528 S | 4/2003 | Wengrower | |
| 6,547,411 B1 | 4/2003 | Dornbusch | |
| 6,765,149 B1 | 7/2004 | Ku | |
| 6,805,469 B1 | 10/2004 | Barton | |
| 6,808,283 B2 | 10/2004 | Tsao | |
| D500,743 S | 1/2005 | Savicki, Jr. et al. | |
| 6,883,927 B2 | 4/2005 | Cunningham et al. | |
| 6,974,910 B2 | 12/2005 | Rohmer | |
| 7,011,422 B2 | 3/2006 | Robertson et al. | |
| 7,036,948 B1 | 5/2006 | Wyatt | |
| 7,064,498 B2 | 6/2006 | Dowling et al. | |
| D542,627 S | 5/2007 | Rohmer et al. | |
| 7,247,793 B2 | 7/2007 | Hinkson | |
| 7,270,436 B2 | 9/2007 | Jasper | |
| 7,318,653 B2 | 1/2008 | Chien | |
| D567,633 S | 4/2008 | Anderson | |
| 7,360,912 B1 | 4/2008 | Savicki, Jr. | |
| D576,566 S | 9/2008 | Wu et al. | |
| D577,985 S | 10/2008 | Kidman | |
| 7,506,990 B2 | 3/2009 | Glazner | |
| 7,547,131 B2 | 6/2009 | Faunce et al. | |
| 7,576,285 B1 | 8/2009 | Savicki, Jr. | |
| D606,029 S | 12/2009 | Chou | |
| 7,745,750 B2 | 6/2010 | Hewson et al. | |
| 7,821,160 B1 | 10/2010 | Roosli et al. | |
| 7,850,322 B2 | 12/2010 | Glazner et al. | |

(56) References Cited

U.S. PATENT DOCUMENTS

| | | |
|---|---|---|
| 7,918,667 B1 * | 4/2011 | Shim .................. H01R 13/7037 439/39 |
| 7,946,871 B1 | 5/2011 | Yu et al. |
| 8,003,886 B1 | 8/2011 | Rintz |
| D650,112 S | 12/2011 | Bryant |
| 8,148,637 B2 | 4/2012 | Davidson |
| 8,304,652 B2 | 11/2012 | McBain |
| 8,393,747 B2 | 3/2013 | Kevelos et al. |
| 8,511,866 B1 | 8/2013 | Mendez |
| 8,564,279 B2 | 10/2013 | Johnson et al. |
| 8,668,347 B2 | 3/2014 | Ebeling |
| 8,697,991 B2 | 4/2014 | Davidson |
| 8,797,723 B2 * | 8/2014 | Hilton .................. H02G 3/123 315/159 |
| D719,699 S | 12/2014 | Bryant |
| 9,482,426 B2 | 11/2016 | Diotte |
| 2001/0046130 A1 | 11/2001 | Cunningham et al. |
| 2003/0013503 A1 | 1/2003 | Menard et al. |
| 2003/0124022 A1 | 7/2003 | Georges et al. |
| 2004/0247300 A1 | 12/2004 | He et al. |
| 2005/0264383 A1 | 12/2005 | Zhang |
| 2006/0065510 A1 | 3/2006 | Kiko et al. |
| 2006/0072302 A1 | 4/2006 | Chien |
| 2006/0077684 A1 | 4/2006 | Yeun |
| 2006/0161270 A1 | 7/2006 | Luskin et al. |
| 2006/0170380 A1 | 8/2006 | Evans |
| 2006/0262462 A1 | 11/2006 | Barton |
| 2008/0073117 A1 | 3/2008 | Misener |
| 2008/0266121 A1 | 10/2008 | Ellul |
| 2009/0153438 A1 | 6/2009 | Miller et al. |
| 2009/0225480 A1 | 9/2009 | Baxter |
| 2009/0284385 A1 | 11/2009 | Tang et al. |
| 2009/0322159 A1 | 12/2009 | DuBose et al. |
| 2011/0056720 A1 | 3/2011 | Davidson |
| 2011/0210833 A1 | 9/2011 | McNeely et al. |
| 2012/0008307 A1 | 1/2012 | Delany |
| 2012/0156937 A1 | 6/2012 | Almouli |
| 2012/0182172 A1 | 7/2012 | Sorensen |
| 2012/0215470 A1 | 8/2012 | Maguire |
| 2012/0316808 A1 | 12/2012 | Frader-Thompson et al. |
| 2013/0063848 A1 | 3/2013 | Thorpe et al. |
| 2013/0221868 A1 | 8/2013 | Diotte et al. |
| 2015/0371534 A1 | 12/2015 | Dimberg et al. |
| 2017/0018890 A1 | 1/2017 | St. Laurent et al. |
| 2017/0018897 A1 | 1/2017 | St. Laurent et al. |

FOREIGN PATENT DOCUMENTS

| | | |
|---|---|---|
| EP | 2211210 | 3/2007 |
| KR | 1019930025223 | 6/1995 |
| KR | 1020080047328 | 11/2009 |
| KR | 1020090098056 | 4/2010 |
| WO | 2007122141 | 11/2007 |
| WO | 2012006812 | 1/2012 |
| WO | 2012033746 | 3/2012 |

OTHER PUBLICATIONS

TekSyCo Technical Systems Company—Plug into the Future, at least as early as Jul. 16, 2009.
Ontel Answer and Affirmative Defenses to Plaintiffs Second Amended Complaint, U.S. District Court filing, Jun. 5, 2017.
Ontel Defendants LPR 2.2(b) Initial Disclosures, U.S. District Court filing, Jul. 14, 2017.
Ontel Defendants LPR 2.4 Preliminary Non-Infringement and Invalidity Contentions, Aug. 8, 2017.
Ontel Defendants Memorandum in Opposition to Plaintiffs Motion for Leave to File a Second Amended Complaint, U.S. District Court filing, Apr. 11, 2017.
Request for Ex Parte Reexamination for U.S. Pat. No. 8,912,442, May 19, 2015.
Request for Ex Parte Reexamination for U.S. Pat. No. 9,035,180, May 19, 2015.
Permaglo Night Light, www.costco.ca, accessed Mar. 21, 2017, 4 pgs.
Permaglo Safety Lighting Products, www.permaglo.com, accessed Mar. 21, 2017, 1 page.
Request for Ex Parte Reexamination for U.S. Pat. No. 8,912,442.
Request for Ex Parte Reexamination for U.S. Pat. No. 9,035,180.

* cited by examiner

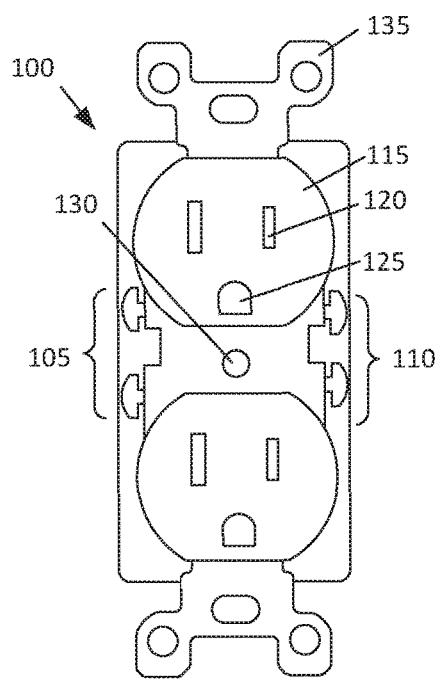
Fig. 1A
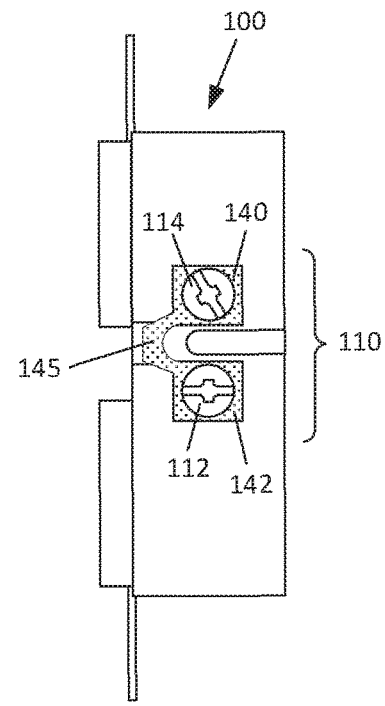
Fig. 1B
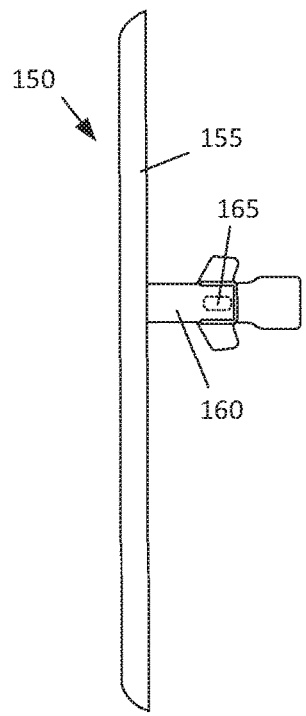
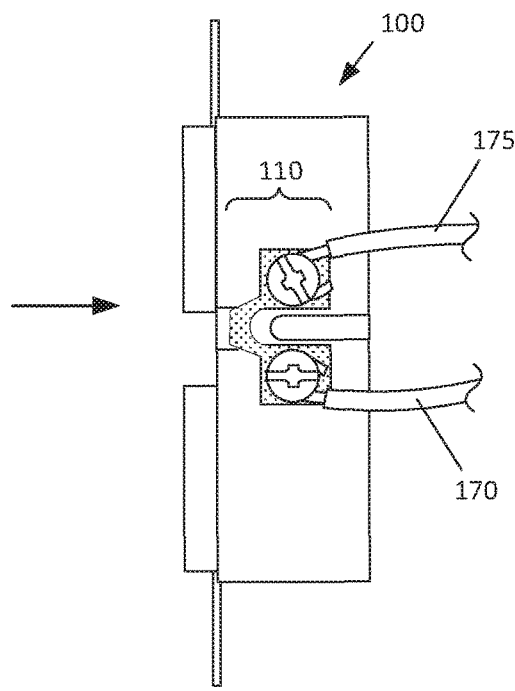
Fig. 1C

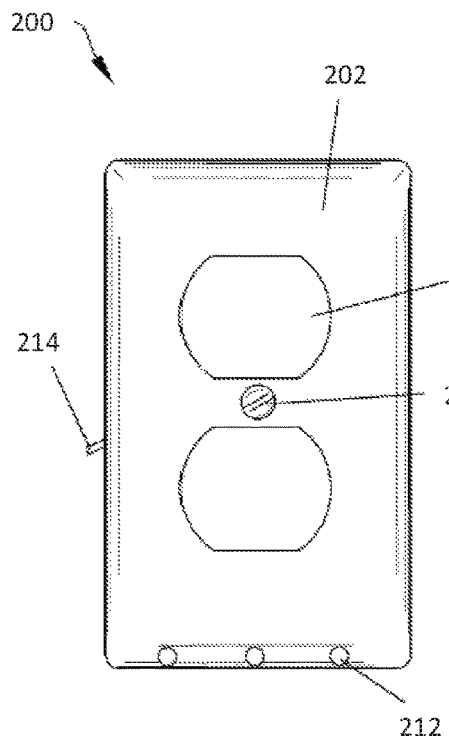
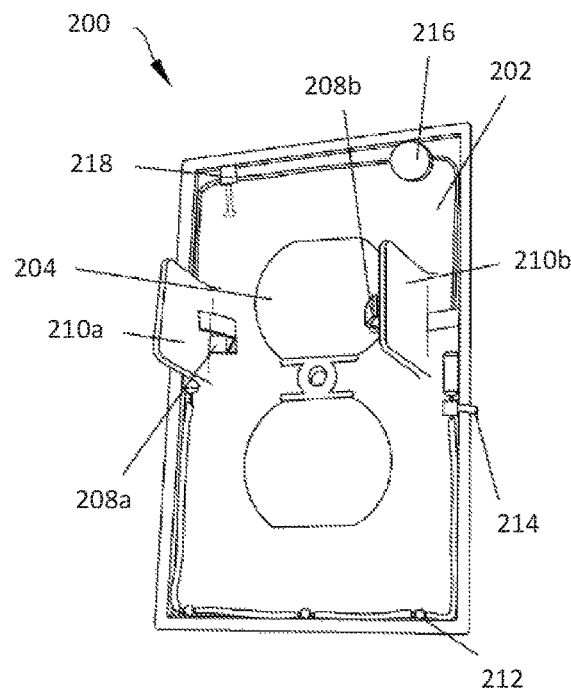
Fig. 2A
Fig. 2B
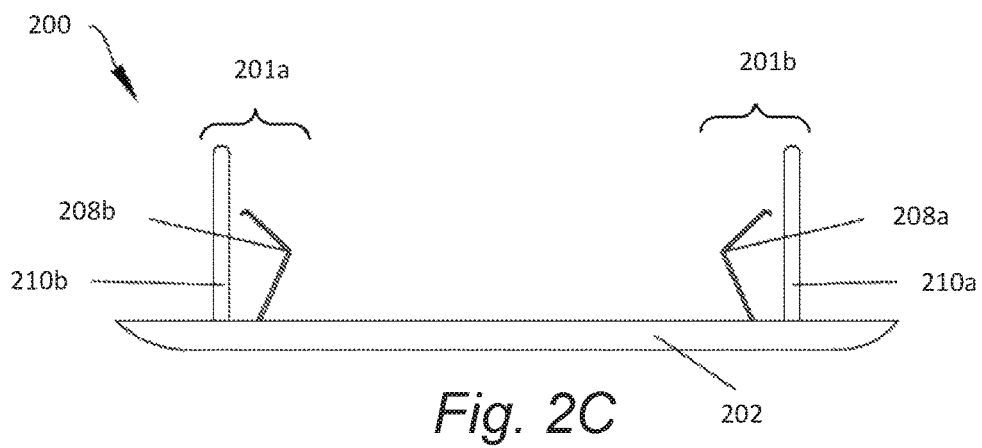
Fig. 2C

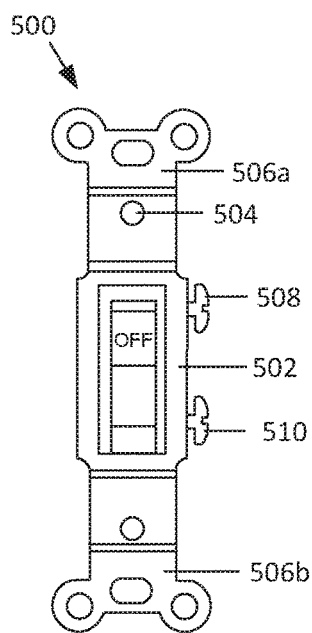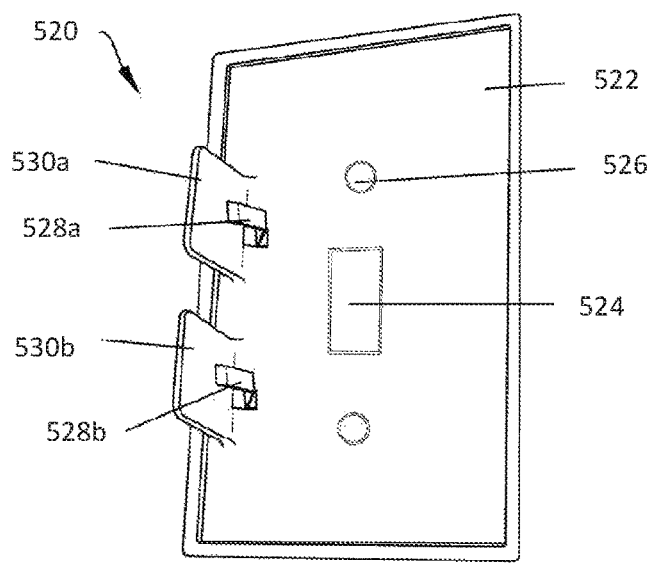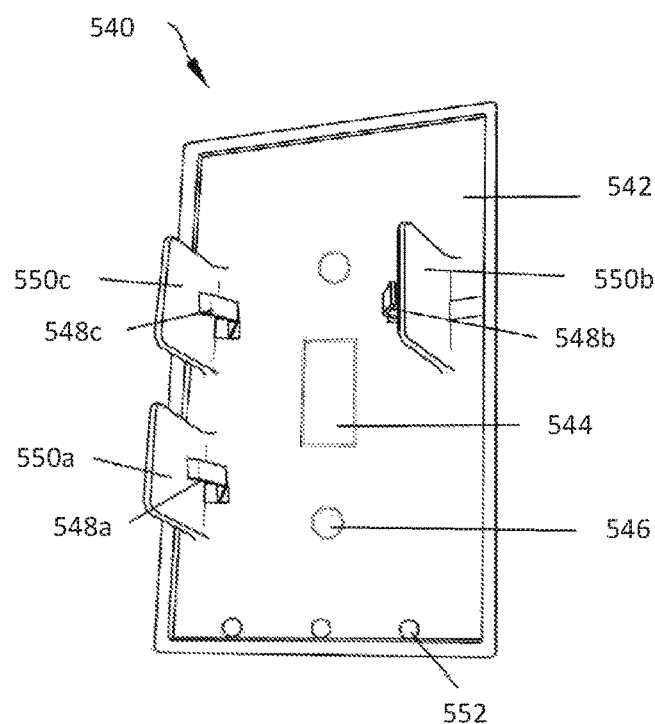
Fig. 5A
Fig. 5B
Fig. 5C

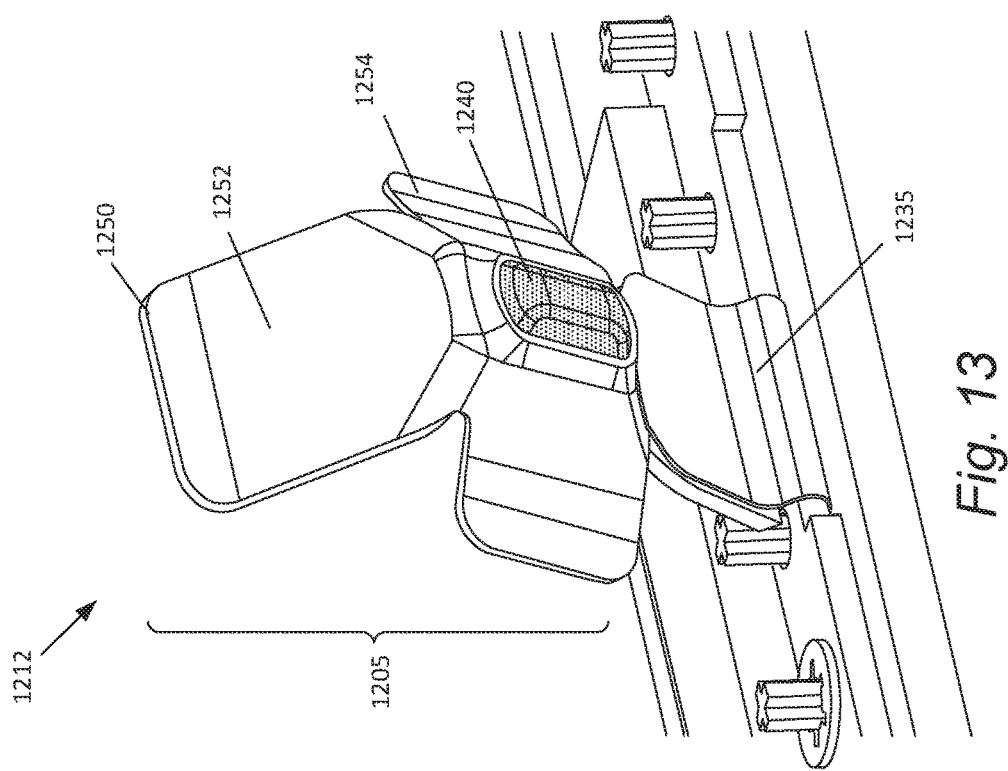

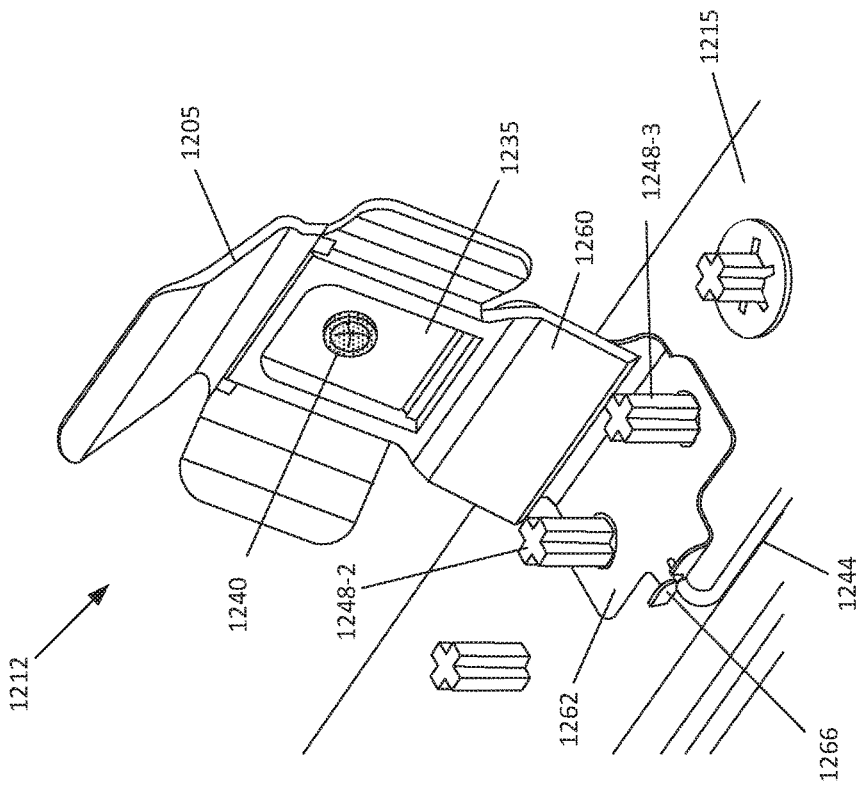
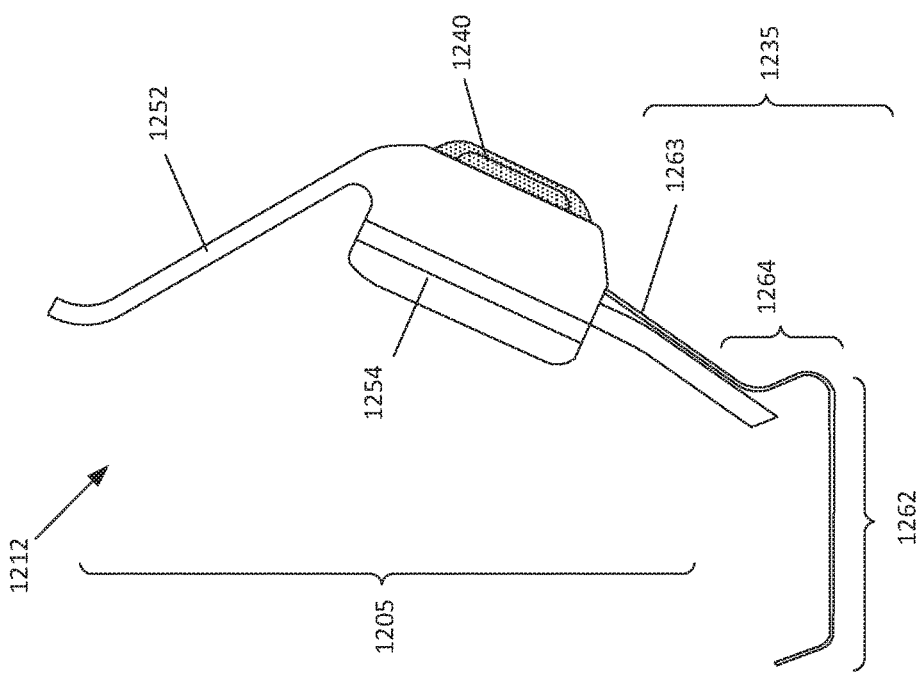

ACTIVE COVER PLATES

RELATED APPLICATIONS

The present application is a continuation-in-part, and claims the benefit under 35 U.S.C. § 120, of U.S. patent application Ser. No. 15/428,099, filed Feb. 8, 2017, titled "Control Switch," which is a continuation-in-part of U.S. patent application Ser. No. 15/409,508, filed Jan. 18, 2017, titled "Current Limited Circuits" which claims priority under 35 U.S.C. § 119(e) to U.S. Provisional Application No. 62/279,831, titled "Active Cover Plates", filed Jan. 18, 2016. These applications are hereby incorporated by reference in their entireties.

The present application is a continuation-in-part, and claims the benefit under 35 U.S.C. § 120, of U.S. patent application Ser. No. 15/406,404, filed Jan. 13, 2017, titled "Active Cover Plates", which is a continuation-in-part, and claims benefit under 35 U.S.C. § 120, of U.S. patent application Ser. No. 15/145,749, filed May 3, 2016, titled "Active Cover Plates," which is a continuation-in-part of and claims the benefit under 35 U.S.C. § 120, of U.S. application Ser. No. 14/549,143, titled "Active Cover Plates", issued as U.S. Pat. No. 9,362,728, filed Nov. 20, 2014, which is a continuation-in-part of U.S. patent application Ser. No. 14/066,621, issued as U.S. Pat. No. 9,035,180, filed Oct. 29, 2013, titled "Active Cover Plates," which is a continuation-in-part, and claims the benefit under 35 U.S.C. § 120, of U.S. application Ser. No. 13/461,915, titled "Active Cover Plates", issued as U.S. Pat. No. 8,912,442, filed May 2, 2012, which claims the benefit under 35 U.S.C. § 119(e) of U.S. Provisional Application No. 61/574,344, titled "Illuminated Cover Plate with Finger-like Contactors for Outlets and Light Switches", filed Aug. 1, 2011. These applications are hereby incorporated by reference in their entireties.

U.S. patent application Ser. No. 15/145,749 further claims priority under 35 U.S.C. § 119(e) to U.S. Provisional Application No. 62/279,831, titled "Active Cover Plates", filed Jan. 18, 2016. These applications are hereby incorporated by reference in their entireties.

U.S. patent application Ser. No. 14/066,621 further claims priority under 35 U.S.C. § 119(e) to U.S. Provisional Application No. 61/720,131, filed Oct. 30, 2012, titled "Active Cover Plates"; U.S. Provisional Application 61/778,386, filed Mar. 12, 2013, titled "Modified Outlets for Use with Active Cover Plates"; and U.S. Provisional Application 61/836,972, filed Jun. 19, 2013, titled "Modified Electrical Devices", which applications are incorporated by reference in their entireties.

U.S. patent application Ser. No. 14/549,143 further claims priority under 35 U.S.C. § 119(e) to U.S. Provisional Application No. 61/906,651, filed Nov. 20, 2013, titled "Powered Wall Plates with Multi-functions"; U.S. Provisional Application No. 62/027,784, filed Jul. 23, 2014, titled "Active Cover Plates"; and U.S. Provisional Application No. 62/081,539, filed Nov. 18, 2014, titled "Active Cover Plates." These applications are hereby incorporated by reference in their entireties.

The present application is also a continuation-in-part, and claims the benefit under 35 U.S.C. § 120, of U.S. patent application Ser. No. 14/678,746, filed Apr. 3, 2015, titled "Modified Electrical Devices", which is a continuation-in-part, and claims benefit under 35 U.S.C. § 120, of U.S. patent application Ser. No. 14/066,637, issued as U.S. Pat. No. 9,035,181, filed Oct. 29, 2013, titled "Modified Electrical Devices", which is a continuation-in-part, and claims the benefit under 35 U.S.C. § 120, of U.S. application Ser. No. 13/461,915, titled "Active Cover Plates", issued as U.S. Pat. No. 8,912,442, filed May 2, 2012, which claims the benefit under 35 U.S.C. § 119(e) of U.S. Provisional Application No. 61/574,344, titled "Illuminated Cover Plate with Finger-like Contactors for Outlets and Light Switches", filed Aug. 1, 2011. These applications are hereby incorporated by reference in their entireties.

U.S. patent application Ser. No. 14/066,637 further claims priority under 35 U.S.C. § 119(e) to U.S. Provisional Application No. 61/720,131, filed Oct. 30, 2012, titled "Active Cover Plates"; U.S. Provisional Application 61/778,386, filed Mar. 12, 2013, titled "Modified Outlets for Use with Active Cover Plates"; and U.S. Provisional Application 61/836,972, filed Jun. 19, 2013, titled "Modified Electrical Devices", which applications are incorporated by reference in their entireties.

BACKGROUND

Modern buildings include wiring to deliver electrical power to lights, outlets, and other devices. The electrical wiring terminates in an electrical box in a wall, ceiling, floor or connected to another structural element. Connections are made to the wiring in the electrical box. For example, electrical wiring may be connected to outlet bodies by stab-in connectors or with screw terminals on the sides of the outlet body. After installation, a cover plate is placed over the outlet body to cover the opening to the box while allowing access to the outlet receptacles on the face of the outlet body. Similar connections are made when installing switches, which are also covered with a cover plate.

BRIEF DESCRIPTION OF THE DRAWINGS

The accompanying drawings illustrate various examples of the principles described herein and are a part of the specification. The illustrated examples are merely examples and do not limit the scope of the claims.

FIGS. 1A, 1B, and 1C show an outlet and an illustrative active cover plate that is configured to fit over the outlet, according to one example of principles described herein.

FIGS. 2A, 2B, and 2C show views of an illustrative active cover plate that is configured to be used over an outlet receptacle, according to one example of principles described herein.

FIGS. 5A, 5B, and 5C show a front view of a single pole light switch, a rear view of an active cover plate configured to be used over a single pole light switch, and a rear view of an active cover plate configured to be used on a multipole light switch, according to one example of principles described herein.

FIG. 13 is a perspective view of an illustrative spring clip mounted to the rear face of a face plate, according to one example of principles described herein.

FIGS. 14A and 14B are a side view and a perspective rear view of a spring clip/prong, according to one example of principles described herein.

Throughout the drawings, identical reference numbers designate similar, but not necessarily identical, elements.

DETAILED DESCRIPTION

Figure 3:
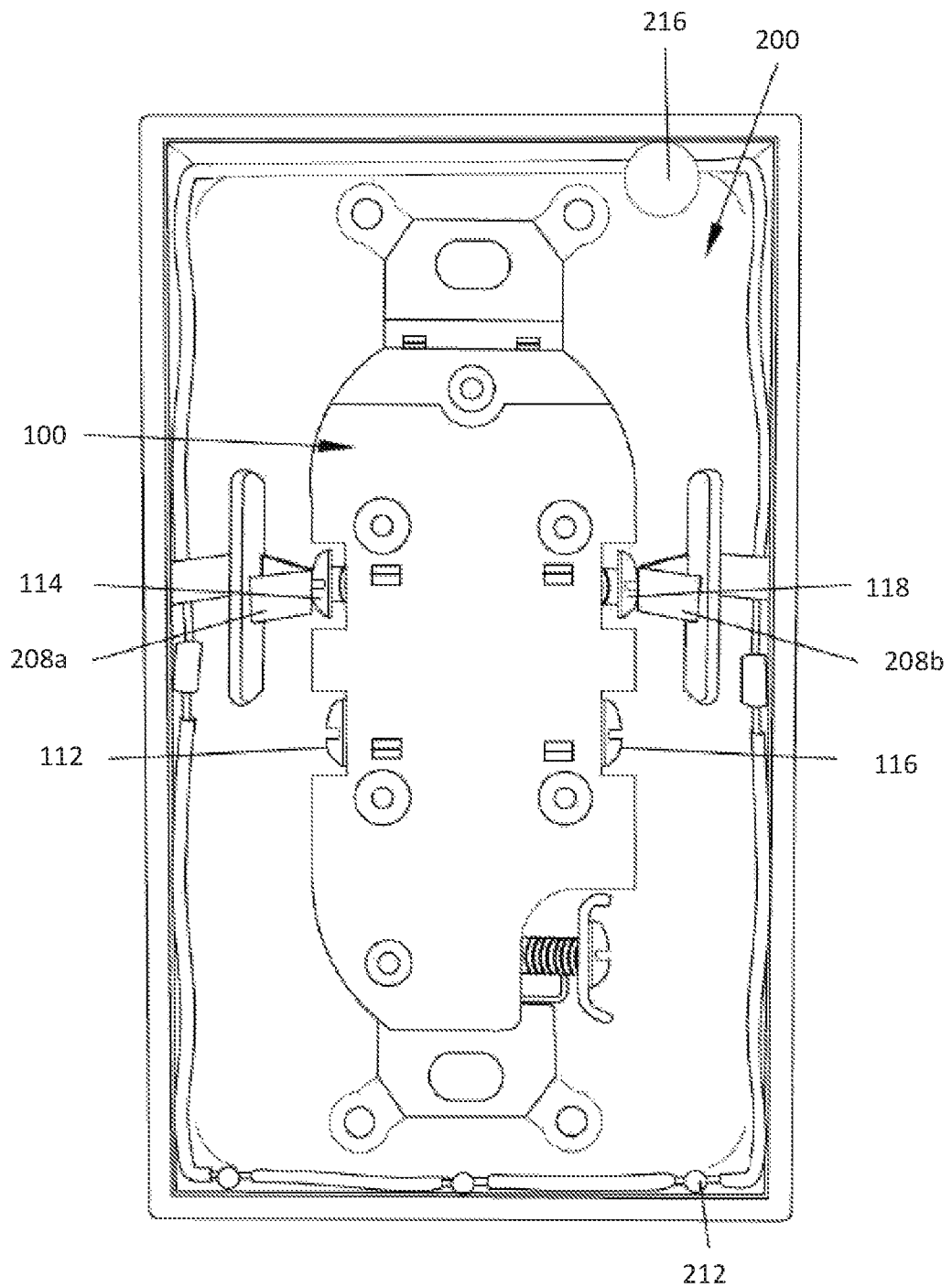
FIG. 3 shows the active cover plate of FIGS. 2A-2C placed over an outlet, according to one example of principles described herein.

Reference will now be made to the figures wherein like structures will be provided with like reference designations. In the following description, for purposes of explanation, numerous specific details are set forth in order to provide a thorough understanding of the present systems and methods. It will be apparent, however, that systems and methods may be practiced without these specific details. It is understood that the figures are diagrammatic and schematic representations of some embodiments of the invention, and are not limiting of the present invention, nor are they necessarily drawn to scale. Reference in the specification to "an example" or similar language means that a particular feature, structure, or characteristic described in connection with the example is included in at least that one example, but not necessarily in other examples.

Additionally, features shown and/or described in connection with one figure may be combined with features shown and/or described in connection with other figures. As used in the present specification and in the appended claims, the term "a number of" or similar language is meant to be understood broadly as any positive number comprising 1 to infinity; zero not being a number, but the absence of a number.

FIGS. 1A, 1B and 1C illustrate an outlet body (100) and connection of an active cover plate (150) to the outlet body (100). In this example, the outlet body (100) is a duplex style National Electrical Manufacturers Association (NEMA) outlet body. The outlet body (100) includes two outlet receptacles (115). Each outlet receptacle (115) includes two power slots (120) and a ground (125).

On either side of the outlet body (100) are screw terminals (105, 110). The building wiring may be connected to the screw terminals by wrapping a stripped end of the house wiring around the screw and then tightening the screw to sandwich the wire between the bottom of the screw and a conductive plate. There may be a first screw terminal on a first side of the outlet body that is connected to a neutral building wire and a second screw terminal on the same or an opposite side of the outlet body that is connected to a hot building wire. For example, the left terminal (105) may be connected to the neutral building wire and the right terminal (110) may be connected to the hot building wire. The screw terminals make internal connections to contacts in the outlet body (100). When an electrical cord is plugged into the outlet receptacle (115), the blades of the electrical cord enter the power slots (120) and make an electrical connection with the contacts. This allows current from the building wiring to pass through the outlet body (100) and into the cord. The outlet body (100) also includes two brackets/yokes (135) to connect it to an electrical box.

FIG. 1B shows a side view of the outlet body (100) showing one of the screw terminals (110). The screw terminal (110) in this example includes conductive backing plates (140, 142) and two screws (112, 114) that thread into the backing plates (140, 142). The backing plates (140, 142) are electrically and mechanically joined by a break off tab (145). The break off tab (145) can be removed to electrically isolate the first screw (112) and its backing plate (142) from the second screw (114) and its backing plate (140).

FIG. 1C shows an active cover plate (150) that is mounted over the outlet body (100). The active cover plate (150) includes a face plate (155) and two spring clips (160) extending rearward from the face plate. In this view, only one spring clip is visible, the other spring clip being directly opposite the first spring clip (see FIG. 12 for a perspective view showing an illustrative embodiment with two spring clips). Each spring clip (160) includes an electrical contact (165). When the active cover plate (150) is placed over the outlet (100), the two spring clips (160) bring the electrical contacts (165) into contact with the screw terminals (105, 110) on either side of the outlet body (100). Ordinarily, the electrical contacts (165) make contact with the heads of the screws (112, 114) because the heads of the screws (112, 114) extend away from the outlet body (100) the farthest. The screw terminals (105, 110) are connected to the building wiring (170, 175). This allows the active cover plate (150) to extract electrical power from the outlet body (100) through the spring clips (160).

Spring clips that extract electrical power from an outlet body or other receptacle body to power an active cover plate may have a number of advantages, including reliability and simplicity. However, the screw terminals may have a variety of positions on the side of the outlet bodies. The location of the screw terminals varies according to the type of outlet body and the manufacturer. While dimensions on the face of the outlet body are generally consistent, the variance in the location of the screw terminals on the sides of the outlet body can produce a significant challenge in creating an active cover plate that fits most or all of the outlets present on the market and/or installed in buildings.

An outlet body is only one example of an electrical device that an active cover plate could interface with. Other examples include switch bodies and electrical boxes with connections for lights, fire alarms, CAT5 cable connections, phone jacks, or other installations over or in electrical boxes. In general, the body that a cover plate of any type fits over is referred to as the "receptacle body."

FIGS. 2A, 2B, and 2C show views of an illustrative active cover plate (200) that is configured to be used over an outlet receptacle. FIG. 2A illustrates a front view of the cover plate (200); FIG. 2B illustrates a rear perspective view of the cover plate (200); and FIG. 2C illustrates a top view of the cover plate (200). In at least one implementation, the cover plate (200) is configured to be placed over an outlet (i.e., the cover plate (200) prevents access to an electrical box containing an outlet unless removed).

FIGS. 2A, 2B and 2C show that a cover plate (200) can include a face plate (202). In at least one implementation, the face plate (202) can mate with the outlet to prevent access to the electrical box in which the outlet is mounted. For example, the face plate (202) can, in combination with the outlet, prevent access to the wires and connections within the electrical box. The face plate (202) can include an insulating material to prevent electrocution of a user. For example, the face plate (202) can include plastic. The face plate (202) can be a single color or can include designs as desired.

FIGS. 2A, 2B and 2C also show that the cover plate (200) can include one or more apertures (204). In at least one implementation, the one or more apertures (204) can provide access to the outlet (i.e., the cover plate (200) covers a portion of an outlet but allows access to another portion). For example, the face plate (202) can prevent access to electrical connections or wiring, while the one or more apertures (204) can allow access to the actual outlet.

FIGS. 2A, 2B and 2C further show that the cover plate (200) can include an attachment (206). In at least one implementation, the attachment (206) can include a screw hole or attached screw. The screw is then inserted into a bore in the outlet which holds the cover plate (200) in place relative to the outlet. Additionally or alternatively, the attachment (206) can include one or more tabs that attach to the outlet or electrical box. For example, the tabs may be inserted into a hole in the outlet or electrical box and be retained by a flange or other mechanism within the outlet or electrical box.

FIGS. 2A, 2B and 2C additionally show that the cover plate (200) can include a first conducting strip (208a) and a second conducting strip (208b) (collectively "conducting strips (208)"). In at least one implementation, the conducting strips (208) can allow the cover plate to draw power (i.e., the conducting strips (208) come in contact with the power connectors/screw terminals of the outlet, drawing power as needed, as described below).

One of skill in the art will appreciate that the conducting strips (208) can be connected to a power supply in some other way. In particular, the conducting strips (208) can be powered wirelessly. For example, the electrical box can include a hardwired inductance mechanism. The conducting strips (208) can be attached to another inductance mechanism, which allows power transfer without a physical connection.

FIGS. 2A, 2B and 2C also show that the cover plate (200) can include a first insulating tab (210a) and a second insulating tab (210b) (collectively "insulating tabs (210)"). In at least one implementation, the insulating tabs (210) can prevent the conducting strips (208) from forming a circuit with external materials (i.e. as the conducting strips (208) come in contact with the power connectors/screw terminals of the outlet, they bend outward and could contact the side of the electrical box or other external materials). This flexibility ensures that the conducting strips (208) remain in contact with the power connectors/screw terminals. However, it can also force the conducting strips (208) toward wires, the electrical box or other materials in the area. The insulating tabs (210) prevent the conducting strips (208) from contacting the wires, electrical box or other materials. In addition, the insulating tabs (210) prevent arcing if the conducting strips (208) get too close to the wires, electrical box or other materials.

The insulating tabs (210) can be the same material as the face plate (202) or can be attached to the face plate (202). For example, the face plate (202) and the insulating tabs (210) can be constructed of a single piece of insulating material. Additionally or alternatively, the insulating tabs (210) can be manufactured separately and then attached to the face plate (202). One of skill in the art will appreciate that the attachment method should retain the insulating capabilities of the insulating tabs (210). For example, the insulating tabs (210) can be attached to the face plate (202) using an insulating glue.

FIGS. 2A, 2B and 2C further show that the cover plate (200) can include a load (212). In at least one implementation, the load (212) can include any electrical device which requires power. For example, the load (212) can include an electrical device embedded within the cover plate (200). Specifically, the load (212) can include lights, motion detectors, photocells, wireless nodes, Bluetooth connectors, smoke detectors, carbon monoxide detectors, cameras, heat detectors, speakers, microphones or any other desired electrical device.

FIGS. 2A, 2B and 2C exemplarily show a load (212) which includes a bank of light emitting diodes. A light-emitting diode (LED) is a semiconductor light source. LEDs can produce high intensity light with less power than conventional light sources. In particular, LEDs convert a higher percentage of input power to light and a lower percentage to heat or other waste. In this example there are three LEDs mounted along the lower edge of the cover plate (200). The LEDs can be configured to emit light out of apertures along the lower edge of the cover plate (200).

FIGS. 2A, 2B and 2C additionally show that the cover plate (200) can include a power switch (214). In at least one implementation, the power switch (214) can allow a user to turn on or off or dim the load (212). For example, if the load (212) is a light, the power switch (214) can allow the user to select the brightness of the light or to turn off the light such that it does not produce light.

FIGS. 2A, 2B and 2C also show that the cover plate (200) can include a battery backup (216). In at least one implementation, the battery backup (216) can ensure that the load (212) continues to receive power for a time, even if power from the power source is discontinued (i.e., the battery backup (216) can be charged by the power source when the power source is active). When the power source is inactive, the battery backup (216) can supply power to the load (212). The battery backup (216) can be configured to provide power to the load (212) but not to the power source, so that when the power source is inactive it does not act as an additional load on the battery backup (216).

FIGS. 2A, 2B and 2C further show that the cover plate (200) can include a network device (218). In at least one implementation, the network device (218) can allow the cover plate (200) to connect to a network. For example, the network device (218) can include an antenna. Additionally or alternatively, the network device (218) can include an Ethernet port or any other connection capable of connecting the cover plate (200) to a desired network.

In at least one implementation, the network can be used to connect multiple cover plates (200) to one another. Additionally or alternatively, the network can allow the cover plate (200) to communicate with a controller or over the Web. The network exemplarily includes the Internet, including a global internetwork formed by logical and physical connections between multiple wide area networks and/or local area networks and can optionally include the World Wide Web ("Web"), including a system of interlinked hypertext documents accessed via the Internet. Alternately or additionally, the network includes one or more cellular RF networks and/or one or more wired and/or wireless networks such as, but not limited to, 802.xx networks, Bluetooth access points, wireless access points, IP-based networks, or the like. For example, the network can include cloud based networking and computing. The network can also include servers that enable one type of network to interface with another type of network.

FIG. 3 illustrates a rear view of the cover plate (200) in combination with the outlet (100). In at least one implementation, the cover plate (200) is configured to be installed on the outlet (100) without the need for hardwiring the cover plate (200). In addition, the cover plate (200) can electrically connect to the outlet/electrical receptacle (100) without occupying a socket in the outlet/electrical receptacle (100).

FIG. 3 shows that the first conducting strip (208a) is in contact with the first power screw (114). In at least one implementation, the first conducting strip (208a) receives power supplied to the first power screw (114). The power can then be delivered to a load (212) within the cover plate (200). One of skill in the art will appreciate that the first conducting strip (208a) making contact with the first power screw (114) is exemplary only. For example, the first conducting strip (208a) can make contact with another power screw (112, 116, 118), the connecting tab between screws (e.g. 145, FIG. 1B), or can receive power in some other way.

FIG. 3 also shows that the second conducting strip (208b) is in contact with the first neutral screw (118). In at least one implementation, the second conducting strip (208b) completes the circuit with a first neutral screw (118). For example, power may be received in the first conducting strip (208a) from the first power screw (114), delivered to the load (212), then returned to the first neutral screw (118) using the second conducting strip (208b). One of skill in the art will appreciate that the second conducting strip (208b) making contact with the first neutral screw (118) is exemplary only. For example, the second conducting strip (208b) can make contact with the second neutral screw (116), the connecting tab between screws (e.g. 145, FIG. 1B), or can complete the circuit in some other way.

FIG. 3 further shows that the load (212) can be active at least when power is being supplied to the first power screw (114) (i.e., as long as a socket receiving power from the first power screw (114) could be used as a power supply for a plug, the load (212) is receiving power). One of skill in the art will appreciate that if the socket is controlled by a switch then the load (212) will likewise be controlled by the switch.

FIG. 3 additionally shows that the battery backup (216) can complete a circuit with the first conducting strip (208a) and the second conducting strip (208b). That is, as long as a socket receiving power from the first power screw (114) could be used as a power supply for a plug, the battery backup (216) is receiving power. Thus, if power is discontinued to the power screw (114), the battery backup (216) is no longer receiving power. However, the battery backup (216) can continue to supply power to the load (212), allowing it to remain active for a time.

Thus, in one example, a cover plate (200) for an outlet/electrical receptacle (100) includes a first conducting strip (208a), wherein the first conducting strip (208a) protrudes rearward from the cover plate (200). The first conducting strip (208a) is configured to contact a first screw terminal (e.g. 110, FIGS. 1A, 1B) of an outlet/electrical receptacle. The first screw terminal of the outlet/electrical receptacle (100) connects the outlet/electrical receptacle (100) to a power source. The cover plate (200) may also include a first insulator (210a, FIG. 2C) to prevent the first conducting strip (208a) from contacting conducting materials other than the first screw terminal (e.g. 110, FIGS. 1A, 1B).

The cover plate (200) may also include a second conducting strip (208b) which also protrudes rearward from the cover plate (200). The second conducting strip (208b) is configured to contact a second screw terminal (e.g. 105, FIGS. 1A, 1B; 116, 118, FIG. 3) of an outlet/electrical receptacle (100). The second screw terminals (116, 118) of the outlet/electrical receptacle (100) also connect the outlet/electrical receptacle (100) to a power source. The cover plate (200) may also include a second insulator (210b, FIG. 2C) to prevent the second conducting strip (208b) from contacting conducting materials other than the second screw terminals (116, 118).

Figure 4A:
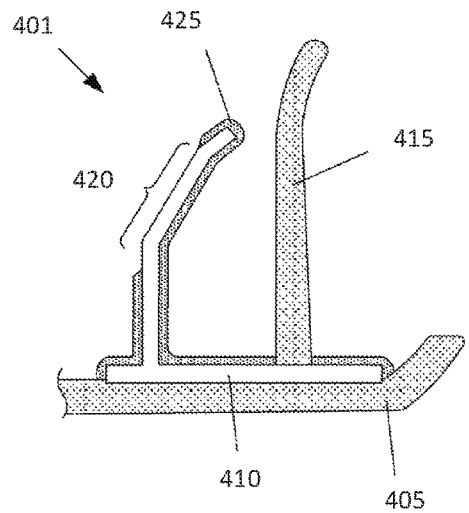
FIGS. 4A, 4B, and 4C show various illustrative embodiments of spring clips extending rearward from a face plate of an active cover plate, according to one example of principles described herein.
Figure 4B:
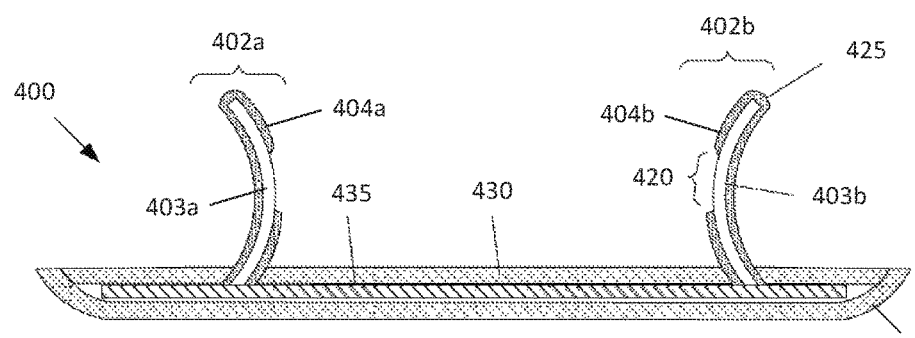
Figure 4C:
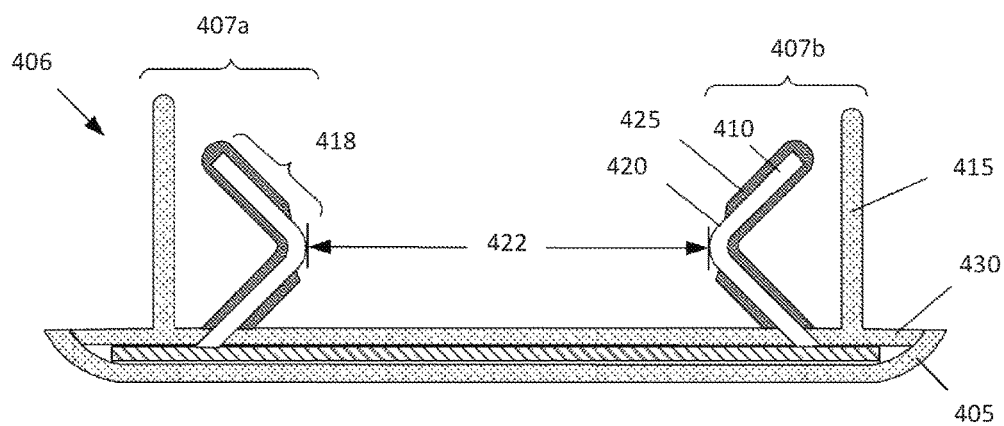

FIGS. 4A, 4B, and 4C show various illustrative embodiments of spring clips extending rearward from a face plate of an active cover plate.

FIG. 4A shows an illustrative cross sectional diagram of a power extractor (401) that is fastened to the face plate (405) of an active cover plate. In this example, the power extractor (401) includes a resilient conductor (410), flexible insulation (425) and separate insulating tab (415). The resilient conductor (410) and the separate insulating tab (415) extend rearward from the face plate (405). As discussed and shown above, this resilient conductor (410) is configured to make electrical contact with a power terminal/screw terminal of an outlet/electrical receptacle. In this implementation, portions of the resilient conductor (410) that will not make electrical contact with the power terminal/screw terminal are coated with conformal insulation (425). An exposed portion (420) of the resilient conductor (410) makes contact with an electrified portion of the outlet/electrical receptacle. In this embodiment, a separate insulating tab (415) is positioned between the rearward extending portion of the resilient conductor (410) and the edge of the face plate (405). The insulating tab (415) extends out from the face plate (405) farther than the resilient conductor (410). This can prevent contact between the resilient conductor (410) and surrounding materials in a variety of ways. For example, the insulating tab (415) may be interposed between the surrounding materials and the resilient conductor (410) when the active cover plate is in place. In some examples, the insulating tab (415) may push surrounding materials away from the resilient conductors (410) when the active cover plate is mounted over the outlet/electrical receptacle. As discussed in more detail below, the insulating tab (415) may also be useful in guiding the active cover plate (400) so that it will correctly align over the outlet/electrical receptacle. For example, the insulating tab (415) may assist in correctly placing the active cover plate over the outlet/electrical receptacle by sliding over the outlet/electrical receptacle and guiding the active cover plate so that the exposed portion (420) of the resilient conductors (410) contact the desired electrified portion of the outlet/electrical receptacle. The insulating tab (415) may also interact with the electrical box that houses the outlet/electrical receptacle to provide positioning guidance. In the example shown in FIG. 4A, the insulating tab (415) is angled at the top to guide the outlet/electrical receptacle into a central position between two opposing resilient conductors (410).

FIG. 4B shows that a cover plate (400) can include spring clips/power extractors (402a, 402b) that include a first resilient conductor (403a) and a second resilient conductor (403b) (collectively "resilient conductors 403"). In at least one implementation, the resilient conductors (403) can allow the cover plate (400) to draw power (i.e., the resilient conductors (403) come in contact with the power terminals/screw terminals of the outlet/electrical receptacle, drawing power as needed, as described above).

FIG. 4B also shows that the cover plate (400) can include a first flexible insulating cover (404*a*) and a second flexible insulating cover (404*b*) (collectively "insulating covers 404"). In at least one implementation, the flexible insulating covers (404) can prevent the resilient conductors (403) from forming a circuit with external materials. For example, as the resilient conductors (403) come in contact with the power terminals/screw terminals of the outlet/electrical receptacle, they bend outward. This flexibility ensures that the resilient conductors (403) remain in contact with the power connectors/screw terminals. However, it can also force the resilient conductors (403) toward the wires, the electrical box or other materials in the area. By adding the insulating covers (404) to the resilient conductors (403), the resilient conductors (403) can be prevented from making undesirable contact with the wires, electrical box or other materials. In addition, the insulating covers (404) may prevent arcing if the resilient conductors (403) get too close to the wires, electrical box or other materials.

FIG. 4B further shows an active cover plate (400) that includes a face plate (405), a circuit board (435), and a back plate (430). The circuit board (435) is sandwiched between the face plate (405) and the back plate (430). The spring clips/power extractors (402) in this example include the arc shaped resilient conductors (403) extending from the circuit board (435) through the back plate (430). In this example, there are no insulating tabs. The insulating covers (404) may be flexible conformal insulation on the resilient conductors (403) to prevent undesirable electrical contact with surrounding material. The flexible conformal insulation may be any of a number of materials. In some examples, the conformal insulation may be a polymer material that is dip coated, brushed, or sprayed onto the resilient conductors (403) or the insulation may be heat shrink tubing placed over the resilient conductors (403). In one implementation, the entire surface of the resilient conductors (403) may be coated with the conformal insulation (404). Selected portions of the conformal insulation may then be removed to make electrical connections between the resilient conductors (403) and the circuit board (435) and to create the exposed portion (420) that contacts an electrified portion of the outlet/electrical receptacle.

FIG. 4C shows a cross sectional diagram of an active cover plate (406) that includes a back plate (430) with integrally molded insulating tabs (415). The insulating tabs (415), resilient conductors (410) and conformal insulation (425) make up the power extractors (407*a*, 407*b*). The insulating tabs (415) are located between the resilient conductors (410) and the edge of the active cover plate (406) to prevent undesirable contact between the resilient conductors (410) and surrounding materials.

For example, the insulating tabs (415) may prevent the resilient conductors (410) from contacting the electrical box that the outlet/electrical receptacle is installed in. In many commercial installations, the electrical box is metal and if a resilient conductor (410) were to contact the metal box, it could cause a short. In the embodiment shown in FIG. 4C, the resilient conductor (410) is protected from electrically shorting to the electrical box by both the insulating tab (415) and by the insulating coating (425) over the resilient conductor (410). The insulating tab (415) may be flexible so that it can conform around or deflect when obstacles are encountered. For example, sheet rock may protrude over the edge of the electrical box. Because the insulating tab (415) is flexible, it can deform around this obstruction and still allow the cover plate (406) to correctly fit to the outlet/electrical receptacle and still provide the desired insulating function.

In some embodiments, the insulating tabs may have a height and width greater than the height and width of the resilient conductor. This ensures that the resilient conductor, while being able to be deflected independently from the insulating tabs, cannot be deflected so far that it contacts materials that are external to the cover plate and receptacles (i.e. the outlet box or wall materials). The insulating tabs may be formed in a variety of ways. For example, the insulating tabs may be integrally molded components of a back plate that connects to the face plate. In other implementations, the insulating tabs may be formed separately and be mechanically connected to either the face plate or the back plate. In other embodiments, the insulating tabs may have a hinged connection with either the face plate or the back plate such that during shipping or storage the insulating tabs lie flat, but during installation and use the insulating tabs are locked in an extended position.

The active cover plate (406) includes two resilient conductors (410) with exposed portions (420) on their inner sides. The resilient conductors (410) face each other and are configured to contact terminals on either side of an outlet/electrical receptacle. In one implementation, the distance (422) between the exposed portions (420) of the resilient conductors (410) is less than a distance between outer surfaces of a first electrical terminal and an outer surface of a second electrical terminal of the outlet/electrical receptacle. At least a portion (418) of the resilient conductors (410) are angled outward toward the edges of the face plate (405), such that contact between the outwardly angled portions and the outlet/electrical receptacle deforms the resilient conductors (410) outward and positions the exposed portions (420) to contact electrical terminals on the outlet/electrical receptacle.

Although the power extractors illustrated in FIGS. 4A-4C show insulated conductive strips with insulating tabs, other types of power extractors could be used. For example, the power extractors may include an insulating tab and a resilient conductor without an insulating covering or may include an insulated conductor without the insulating tab. In other implementations, the power extractors may include one or more inductive coils.

Thus in one implementation, an active cover plate may include a face plate, a load, and electrically insulated power extractor extending rearward from the face plate to interface with an outlet/electrical receptacle, wherein the power extractor extracts electrical power from the outlet/electrical receptacle to energize the load. A face plate is a portion of an active cover plate that is exposed to view by a user when the active cover plate is fastened over an outlet/electrical receptacle. The load is any element or combination of elements that consumes electrical power. A variety of loads are described above, such as light sensors, lights, motion detectors, resistors, diodes, sensors, communication modules, speakers, and other loads. As used in the specification and appended claims, the term "electrically insulated power extractor" refers to mechanisms that extract power from an outlet/electrical receptacle. Specifically, "electrically insulated power extractor" refers to:

1) A resilient conductor insulated by a flexible insulating cover that encapsulates the resilient conductor except for exposed portion configured to electrically contact a terminal of an electrical receptacle;

2) A resilient conductor insulated by an insulating tab extending rearward from the face plate, wherein the insulating tab is interposed between the resilient conductor and an edge of the face plate. The resilient conductor may or may not include a flexible insulating cover. In some implementations, the insulating tab is a free standing structure separate from the resilient conductor;

3) An encapsulated inductive coil configured to inductively extract power from the electrical receptacle.

In each of the three embodiments of the electrically insulated power extractor, the power extractor includes a free standing, self supporting body. For example, the resilient conductor, the insulating tab, and the encapsulated inductive coil may all be free standing, self supporting bodies. A resilient conductor refers to an electrical resilient conductor that springs back into a predetermined shape after bending or being compressed. When a resilient conductor is physically restrained from returning to its predetermined shape, the resilient conductor exerts a spring force on the restraining object. An electrical terminal is any conductive portion of an outlet/electrical receptacle from which power can be extracted or deposited. For example, a hot terminal, a neutral terminal, traveler terminals, and grounds are all electrical terminals. Screws and/or tabs on the side of an outlet/electrical receptacle are electrical terminals.

FIGS. 5A, 5B, and 5C show a front view of a single pole light switch (500), a rear view of an active cover plate (520) configured to be used over a single pole light switch (500), and a rear view of an active cover plate (540) configured to be used on a multi-pole light switch.

FIG. 5A illustrates an example of a switch (500). In at least one implementation, the switch (500) can provide power to an external device which a user desires to turn on and off. For example, the switch (500) is configured to allow a user to control whether a device connected to the switch is on or off. The switch (500) can be hardwired to the device or can be connected via an outlet and plug or through some other indirect connection.

FIG. 5A shows that the switch (500) can include a body (502). In at least one implementation, the body (502) can include a movable portion that allows the user to control the state of the connected electrical device. For example, the body (502) can include a toggle, which can be moved as desired to change the on/off state of the connected electrical device. Additionally or alternatively, the body (502) can include a button, or touch screen or some other mechanism for detecting user control.

FIG. 5A also shows that the switch (500) can include a bore (504). In at least one implementation, the bore (504) is configured to receive the attachment of a cover plate. In particular, the bore (504) can allow the attachment of the cover plate to secure the cover plate relative to the switch (500). For example, the bore (500) can include a threaded opening for receiving a screw or any other device for the cover plate attachment. The cover plate can be configured to mate with the body (502) in order to maintain the proper orientation.

FIG. 5A further shows that the switch (500) can include a first mounting piece (506a) and a second mounting piece (506b) (collectively "mounting pieces (506)"). In at least one implementation, the mounting pieces (506) are configured to attach the switch (500) to an electrical box. For example, the mounting pieces (506) secure the switch (500) in place, ensuring that it does not move or otherwise reorient as the user operates the portion of the body (502) which allows the user to change the on/off state of the connected electrical device. The mounting pieces (506) can include "yokes" or tabs that are configured to prevent the switch (500) from being installed too deeply into the electrical box (i.e., the yokes can keep the mounting pieces (506) approximately flush with the wall during installation).

FIG. 5A additionally shows that the switch (500) can include a power screw (508). In at least one implementation, the power screw (508) allows the switch (500) to be connected to an active power source. Additionally or alternatively, the power screw (508) can allow the switch (500) to be connected to other active loads, such as additional switches, outlets or any other active load. The switch (500) may include a power input which allows a wire to be inserted directly without the need to attach the wire to the power screw (508). One of skill in the art will appreciate that such inputs remain connected to the power screw (508) such that a wire from another active load and connected to the power screw (508) is able to provide power to the additional active load.

FIG. 5A also shows that the switch (500) can include a neutral screw (510). In at least one implementation, the neutral screw (510) returns power to the power source, completing the electrical circuit. For example, power flows from the power source to the power screw (508), through the switch (500), to the neutral screw (510) and back to the power source forming an electrical circuit. Additionally or alternatively, the neutral screw (510) can allow the switch (500) to be connected to other active loads, such as additional switches, outlets or any other active load. The switch (500) may include a power input which allows a wire to be inserted directly without the need to attach the wire to the neutral screw (510). One of skill in the art will appreciate that such inputs remain connected to the neutral screw (510) such that a wire from another active load and connected to the neutral screw (510) is able to provide power to the additional active load.

One of skill in the art will appreciate that the power screw (508) and the neutral screw (510) can be of any desired voltage. For example, voltage can include 100 V, 120 V, 220 V, 230 V or any other desired voltage.

FIG. 5B illustrates an alternative example of a cover plate (520). FIG. 5B illustrates a rear perspective view of the cover plate (520). In at least one implementation, the cover plate (520) can be used with an alternative electric device, such as a light switch. One of skill in the art will appreciate that the cover plate (520) can be configured for use at any electrical box.

FIG. 5B shows that the cover plate (520) can include a face plate (522). In at least one implementation, the face plate (522) can mate with the switch to prevent access to the electrical box in which the switch is mounted. For example, the face plate can, in combination with the switch, prevent access to the wires and connections within the electrical box. The face plate (522) can include an insulating material to prevent electrocution of a user. For example, the face plate (522) can include plastic. The face plate (522) can be a single color or can include designs as desired.

FIG. 5B also shows that the cover plate (520) can include one or more apertures (524). In at least one implementation, the one or more apertures (524) can provide access to the switch. For example, the cover plate (520) may cover a portion of a switch, but allows access to another portion. For example, the face plate (522) can prevent access to electrical connections or wiring. In contrast, the one or more apertures (524) can allow access to the actual switch.

FIG. 5B also shows that the cover plate (520) can include an attachment (526). In at least one implementation, the attachment (526) can include a screw hole or attached screw. The screw then is inserted into a bore in the switch or electrical box which holds the cover plate (520) in place relative to the switch. Additionally or alternatively, the attachment (526) can include one or more tabs that are attached to the switch or electrical box. For example, the tabs are inserted into a hole in the switch or electrical box and are retained by a flange or other mechanism within the switch or electrical box.

FIG. 5B additionally shows that the cover plate (520) can include a first conducting strip (528a) and a second conducting strip (528b) (collectively "conducting strips (528)"). In at least one implementation, the conducting strips (528) can allow the cover plate to draw power. For example, the conducting strips (528) come in contact with the power connectors of the switch, drawing power as needed, as described below.

FIG. 5B also shows that the cover plate (520) can include a first insulating tab (530a) and a second insulating tab (530b) (collectively "insulating tabs" (530)). In at least one implementation, the insulating tabs (530) can prevent the conducting strips (528) from forming a circuit with external materials. For example, as the conducting strips (528) come in contact with the power connectors of the switch, they bend outward. This flexibility ensures that the conducting strips (528) remain in contact with the power connectors. However, it can also force the conducting strips (528) toward wires, the electrical box or other materials in the areas. The insulating tabs (530) prevent the conducting strips (528) from contacting the wires, electrical box or other materials. In addition, the insulating tabs (530) prevent arcing if the conducting strips (528) get too close to the wires, electrical box or other materials.

The insulating tabs (530) can be the same material as the face plate (522) or can be attached to the face plate (522). For example, the face plate (522) and the insulating tabs (530) can be constructed of a single piece of insulating material. Additionally or alternatively, the insulating tabs (530) can be manufactured separately and then attached to the face plate (522). The cover plate (520) may include a variety of electrical loads as described above.

FIG. 5C illustrates an alternative example of a cover plate (540). In at least one implementation, the cover plate (540) can be used with an alternative electric device, such as a 3-way light switch. For example, modifications to the cover plate (540) can allow for connection to any desired device within an electrical box, even though the actual wiring configuration may vary depending on the device.

FIG. 5C shows that the cover plate (540) can include a face plate (542). In at least one implementation, the face plate (542) can mate with the 3-way switch to prevent access to the electrical box in which the 3-way switch is mounted. For example, the face plate (542) can, in combination with the 3-way switch, prevent access to the wires and connections within the electrical box. The face plate (542) can include an insulating material to prevent electrocution of a user. For example, the face plate (542) can include plastic. The face plate (542) can be a single color or can include designs as desired.

FIG. 5C also shows that the cover plate (540) can include one or more apertures (544). In at least one implementation, the one or more apertures (544) can provide access to the 3-way switch. I.e., the cover plate (540) covers a portion of the 3-way switch, but allows access to another portion. For example, the face plate (542) can prevent access to electrical connections or wiring. In contrast, the one or more apertures (544) can allow access to the actual 3-way switch.

FIG. 5C further shows that the cover plate (540) can include an attachment (546). In at least one implementation, the attachment (546) can include a screw hole or attached screw. The screw then is inserted into a bore in the 3-way switch or electrical box that holds the cover plate (540) in place relative to the 3-way switch. Additionally or alternatively, the attachment (546) can include one or more tabs that are attached to the 3-way switch or electrical box.

FIG. 5C additionally shows that the cover plate (540) can include a first conducting strip (548a), a second conducting strip (548b) and a third conducting strip (548c) (collectively "conducting strips (548)"). In at least one implementation, the conducting strips (548) can allow the cover plate (540) to draw power. For example, the conducting strips (548) come in contact with the power connectors of the 3-way switch, drawing power as needed, as described below.

FIG. 5C also shows that the cover plate (540) can include a first insulating tab (550a), a second insulating tab (550b) and a third insulating tab (550c) (collectively "insulating tabs (550)"). In at least one implementation, the insulating tabs (550) can prevent the conducting strips (548) from forming a circuit with external materials. For example, as the conducting strips (548) come in contact with the power connectors of the 3-way switch, they bend outward. This flexibility ensures that the conducting strips (548) remain in contact with the power connectors. However, it can also force the conducting strips (548) toward wires, the electrical box or other materials in the area. The insulating tabs (550) prevent the conducting strips (548) from contacting the wires, electrical box or other materials. In addition, the insulating tabs (550) prevent arcing if the conducting strips (548) get too close to the wires, electrical box or other materials.

The insulating tabs (550) can be the same material as the face plate (542) or can be attached to the face plate (542). For example, the face plate (542) and the insulating tabs (550) can be constructed of a single piece of insulating material. Additionally or alternatively, the insulating tabs (550) can be manufactured separately and then attached to the face plate (542). FIG. 5C further shows that the cover plate (540) can include a load (552). In this example and as discussed above, the load may include 3 LEDs spaced along a bottom edge of the active cover plate (540).

Figure 6B:
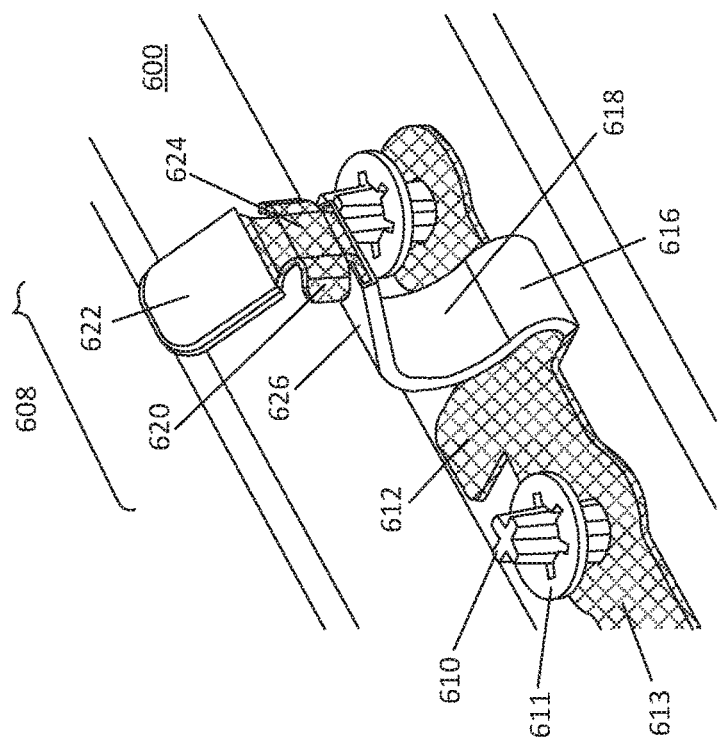
FIGS. 6A and 6B show various views of one embodiment of an active cover plate for use with an electrical receptacle, according to one example of principles described herein.
Figure 6A:
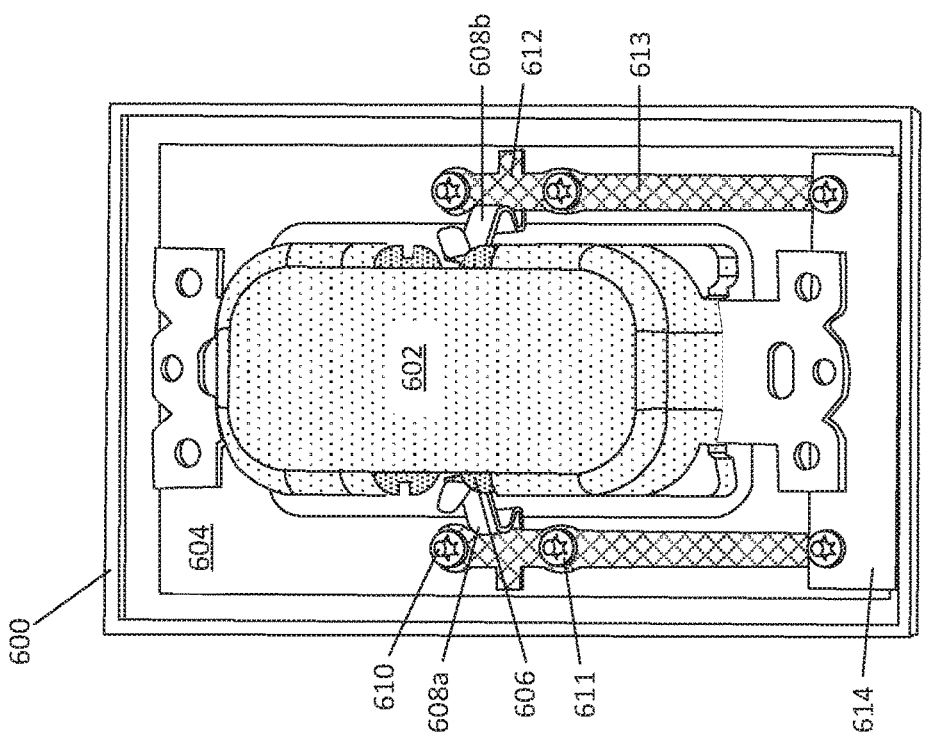

FIG. 6A describes one illustrative construction of the active cover plate (600) and its connection to the outlet body (602). As discussed above, spring clips (608a, 608b) engage with screws (606) on the sides of the outlet (602). The spring clips (608a, 608b) bring power to all of the circuitry/modules (614) that may be contained within the active cover plate (600). In this example, the circuitry (614) may include LED lighting. The spring clips (608a, 608b) may be secured to the face plate (604) in a variety of ways. In this example, the metal base (612) of the spring clips (608a, 608b) fits over posts (e.g. 610) extending out of the back of the face plate (604). The metal base (612) may then be secured by press nuts (611) that fit over the posts (610), by heat staking the posts, or by cold pressing the posts.

The circuitry (614) may include a printed circuit board (PCB) with a variety of components such as LEDs, a sensor, and a power supply. The LEDs may be mounted directly to the PCB and light from the LEDs is directed to the desired apertures in the face plate (604) using light pipes. There can be any number of LEDs included in the design. In this example, there are 3 or 4 LED/light pipes. Although this example shows the circuitry (614) located only at the bottom of the outlet cover, the circuitry (614) could have a variety of configurations, including a "U" shaped PCB that extends up the sides to the spring clip locations. This may allow for the circuitry (614) to be placed along the sides of the outlet (602) and the lower portion of the PCB to only contain the LEDs. This can provide additional clearance for the metal bracket on the bottom of the outlet (602) by removing the portion of the PCB that is between the outlet (602) and the inner surface of the face plate (604).

FIG. 6B is a detail perspective view of the spring clip (608), its base (612), the posts (610) and press nuts (611) on the posts. In this example, the spring clip (608), base (612), and conductor (613) to the circuitry (614, FIG. 6A) are formed from a single piece of a resilient metal sheet. After the metal sheet is cut into the desired shape, including a strip that will form the spring clip (608) and holes to receive the posts (610), the strip is formed into the spring clip (608). This may be done in a variety of ways, including stamping processes. In this example, the spring clip (608) has a sinusoidal shape, with a convex base curve (616), a concave mid curve (618), and an upper convex curve that contains the contact region (624) and an angled flange (622) to guide the spring clip (608) over the screws. In this example, the base curve (616), mid curve (618), and angled flange (622) are covered by electrical insulation (626). Although the entire spring clip (608) may flex, the majority of the bending may occur in the base curve (616). The mid curve (618) provides additional clearance away from the outlet body.

The contact region (624) includes a compound curvature with two wings (620) that extend to the left and right of the center of the contact region (624). The wings (620) allow the spring clip (608) to move vertically up and down after the cover plate (600, FIG. 6A) has been placed over the outlet (602, FIG. 6A). In some instances, users may initially place the cover plate (600) too high or low on the outlet (602). After engaging the spring clips/prongs (608) with the sides of the outlet (602), the user may then move the cover plate (600) vertically into the correct position. This moves the spring clips (608) over the sides of the outlet (602). To prevent the spring clip (608) from snagging or being caught during this vertical motion, the wings (620) are angled backwards to direct the spring clip (608) over the obstacle. For example, the power screws and wires connected to the outlet (602) by the power screws may be obstacles that the spring clip/prong (608) may become snagged on. The wings (620) reduce the likelihood of snagging by directing obstacles under the spring clip (608) and producing additional deformation of the spring clip (608) so that it can move over the obstacles. In this example, the wings (620) are not electrically insulated. The angled flange (622) is configured to direct the spring clip (608) around the outlet body (602) as the active cover plate (600) is pressed over the outlet body (602).

An outlet (602) may be installed in a receptacle box in one of two orientations: right-side up or upside down. Outlets can be installed in the receptacle box in either direction and still function properly. Consequently, the orientation of the outlet can be selected according to the convenience the installer/user. The spring clips (608) in this example are designed to connect to the power screws on both sides of the outlet (602) regardless of the orientation of the outlet (602). Thus, in this example, the active cover plate (600) can be installed and operate in an upright position regardless of the orientation of the outlet (602).

Figure 7B:
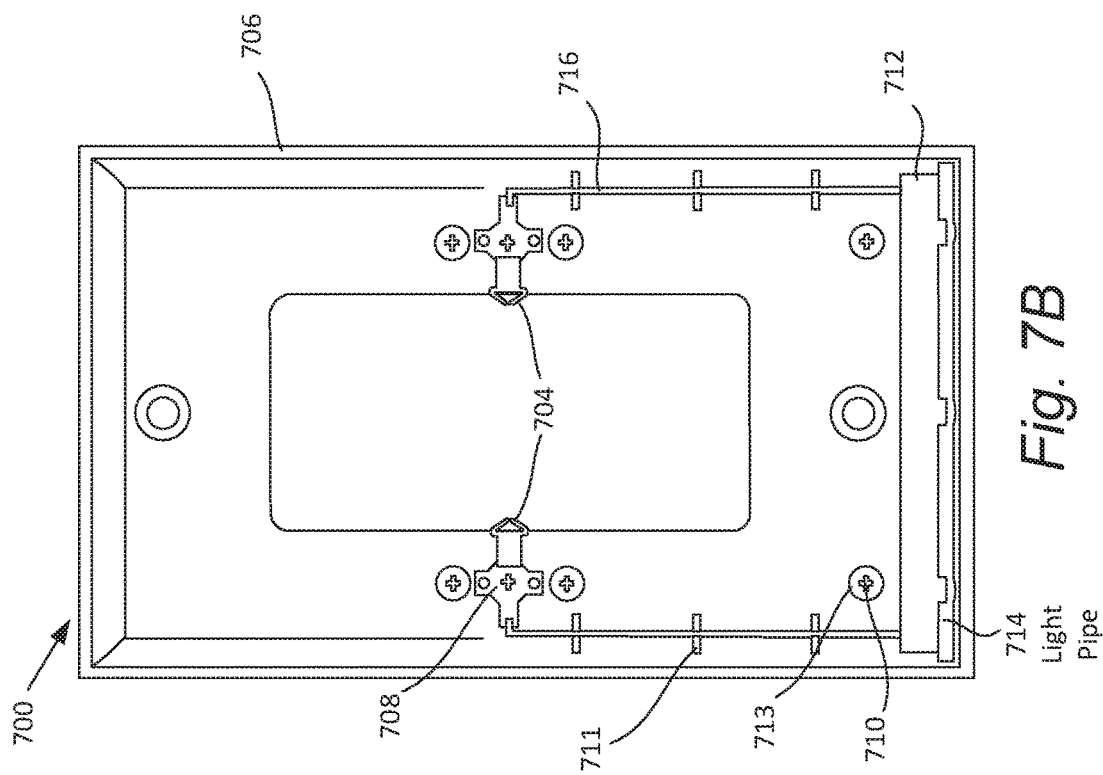
FIGS. 7A and 7B show rear views of an illustrative active cover plate for use with an electrical receptacle, according to one example of principles described herein.
Figure 7A:
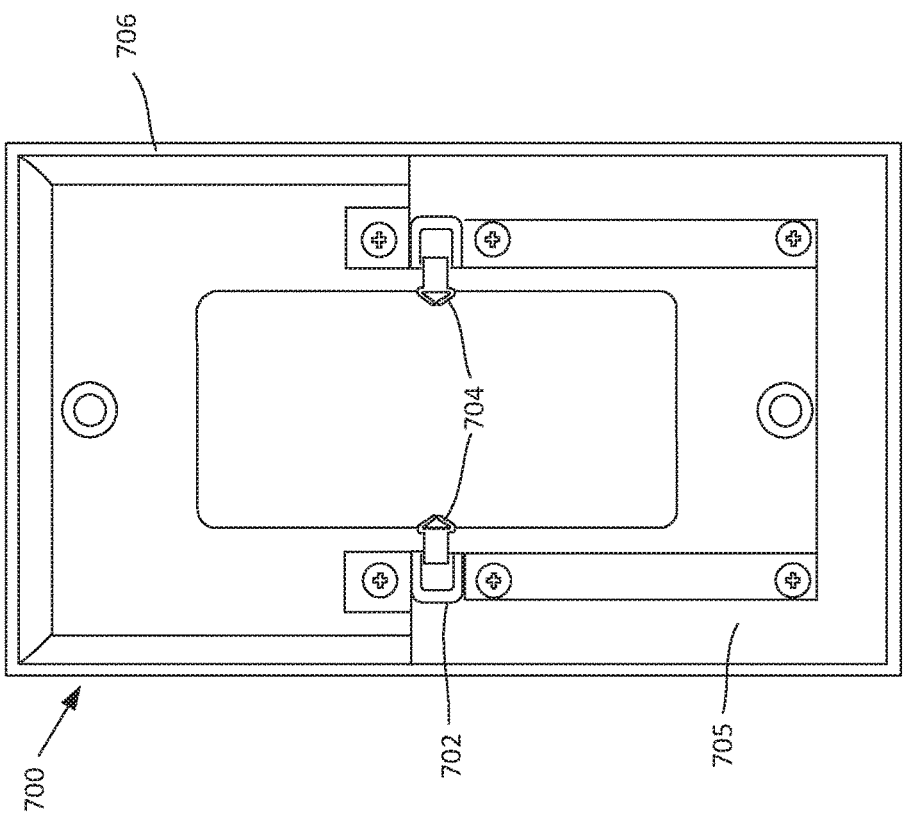

FIGS. 7A and 7B show rear views of an illustrative active cover plate (700) with spring clips (704) for use over an electrical receptacle. The embodiment shown is specifically adapted for use with a décor outlet. In this example, the active cover plate (700) includes a face plate (706), a back plate/sandwich plate (705) with two integral walls that are shaped like "U" channels, and spring clips (704). In this example, the sandwich plate (705) and spring clips (704) are connected to the face plate (706) with press nuts (713) that fit over posts (710). The bases (708) of the spring clips (704) are sandwiched between the face plate (706) and the sandwich plate (705). The posts (710) are integrally molded parts of the face plate (706). When the press nuts (713) are pressed over the posts (710), the sandwich plate (705) is forced against the bases (708) of the spring clips (704), firmly holding the spring clips (704) in place.

FIG. 7A is a rear view of the cover plate (700). This view illustrates that the U channel shaped wall (702) surrounds the rear and sides of the spring clips (704) and prevents accidental contact with the spring clips (704). When the active cover plate (700) is installed over an outlet body, the spring clip (704) is surrounded on all four sides. Three sides are covered by the U channel (702) and the outlet body covers the fourth side. The walls (702) prevent the uninsulated spring clips/prongs (704) from electrically contacting exterior conductors (e.g. a metal receptacle box or an electrical conductor in the receptacle box).

FIG. 7B shows a rear view of the cover plate (700) with the sandwich plate (705) removed to show the circuit board (712), electrical conductors (716), and spring clips (704). Each of the spring clips (704) include a base (708). In this example the base (708) has a cruciform shape with an attachment post passing through the intersection. Electrical conductors (wires) (716) are connected to each of the bases and pass down the sides of the face plate (706) to a printed circuit board (712). The wires (716) are held in place by wire brackets (711). The wires (716) conduct electrical power to the circuit board (712) to power the functionality provided by the circuit board (712).

Figure 8:
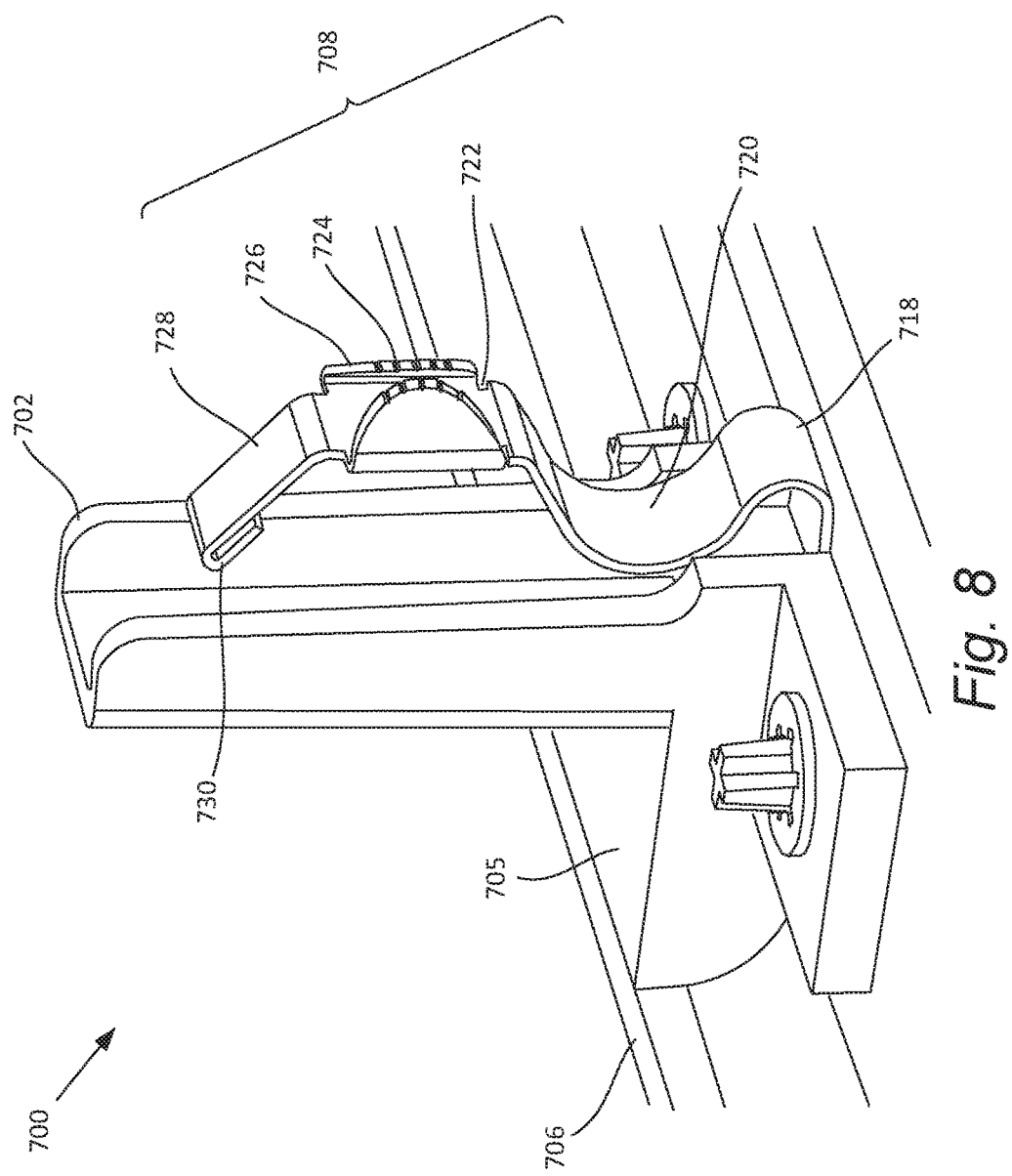
FIG. 8 shows a perspective view of an illustrative spring clip mounted to the back of a face plate, according to one example of principles described herein.

FIG. 8 shows a perspective view of an illustrative spring clip (708) mounted to the back of a face plate (706). The spring clip (708) includes a convex base curve (718), a concave mid curve (720), angled wings (726), an angled end portion (728), and a folded end (730). As discussed above, the angled end portion (728) directs the spring clip (708) outward as the active cover plate (700) is initially brought into contact with the outlet or switch body. Folding the end of the spring clip (730) creates a smooth end shape that will not gouge or snag on surrounding materials.

The structure of the spring clip (708) is designed to allow for large amounts of flexibility without permanent deformation. The spring clip (7084) can be formed from a variety of different materials including copper alloys, spring steels and beryllium alloys. As discussed above, the spring clips (708) are designed to make electrical contact with screw terminals on the sides of the outlet body. The screw terminals may have a variety of different widths, depending on the width of the outlet body and whether the screws are screwed out of the body or into the body. In one design, for small amounts of deformation, the spring clips (708) primarily move outward by cantilever bending with most of the rotation occurring in and around the base curve (718). For larger amounts of deformation, the back portions of the spring clip (708) begin to contact the inner wall of the U channel (702). This changes the bending locations within the spring clips (708) and prevents the base curve (718) from being plastically deformed. The back portions of the spring clip (708) that may contact the U channel (702) include the back portion of the mid curve (720) and the folded end (730) of the spring clip (708). These portions are designed to slide within the U channel (702) during deformation. For example, the rounded back portion of the mid curve (720) and folded end (730) both present smooth rounded surfaces that will slide easily in the U channel (702) without becoming caught. The spring becomes much stiffer when the back of the mid curve (720) and folded end (730) contact the back of the U channel (702). The bending then occurs in different areas than the base curve (718). For example, a significant amount of the additional bending may occur in regions that are immediately above and below the angled wings (726).

The angled wings (726) are portions of the spring clip (708) that are bent at an acute angle back over the front of the body of the spring clip (708). Together, the two folded wings (726) form a pyramid like shape that directs the spring clip (708) over obstructions on the side of the outlet or switch body. For example, when the rounded edges of the wings (726) encounter a screw during the initial placement of the active cover plate (700) over the outlet body, the rounded edges will push the spring clip (708) backward to pass over the screw. Similarly, the outward faces of the wings (726) will direct the spring clip (708) over obstructions (such as screws, wires, and contours of the outlet body) when the active cover plate (700) is moved vertically during adjustment of the position of the active cover plate (700) after it has been pushed over the outlet or switch body. The angled wings (726) create a stiff portion in the center of the spring clip (708). Bending will primarily occur at locations other than this stiffer portion. The angled wings (726) are the portion of the spring clips (708) that extend the farthest inward toward the center of the active cover plate (700) and will be the portion of the spring clip (708) that directly engages the screw terminals in most embodiments.

In some implementations, the edges and/or outward facing faces of the wings (726) may have a number of grooves (724) or other texturing. In some examples, this texture may be used to remove paint, primer, and other insulating material from the screws or screw terminals. In the example shown in FIG. 8, there are grooves (724) across the edges of the wings (726). When the spring clips (708) are inserted over the body of the outlet, the edges of the grooves (724) and ridges between the grooves (724) scrape over the surface of the screws. Because only very small pointed portions of the spring clip (708) contact the painted surface, they can be relatively effective in cutting through and scraping off the paint to make electrical contact with the underlying screws. The active cover plates (700) draw power on the order of milliamps from the side terminals. Consequently, large contact areas for electrical conduction are not required. One or more point contacts with each screw terminal can be sufficient to safely and reliably draw the desired amounts of power from the screw terminals.

The U channel (702) provides a number of benefits as it interacts with the spring clip (708). It shields the screw terminal from accidental contact with exterior devices or components. The U channel (702) also prevents undesirable plastic bending of the spring clip (708) by supporting the spring clip (708). For example, when the folded end (730) of the spring clip (708) is between the side walls of the U channel (702), lateral forces (for example, forces exerted on the spring clip (708) during vertical motion relative to the outlet body) will not bend the spring clip (708) to the side.

Embodiments that use the U channel (702) shaped wall or other similar insulating shielding or tab may not require insulation placed directly on the spring clip (708). In the example shown in FIGS. 7A, 7B, and 8, the spring clip (708, FIG. 8; 704 FIG. 7A) does not have any insulating coating because it is protected and insulated from the surroundings by the wall. In other embodiments, walls may be used in conjunction with an insulated spring clip.

Figure 9:
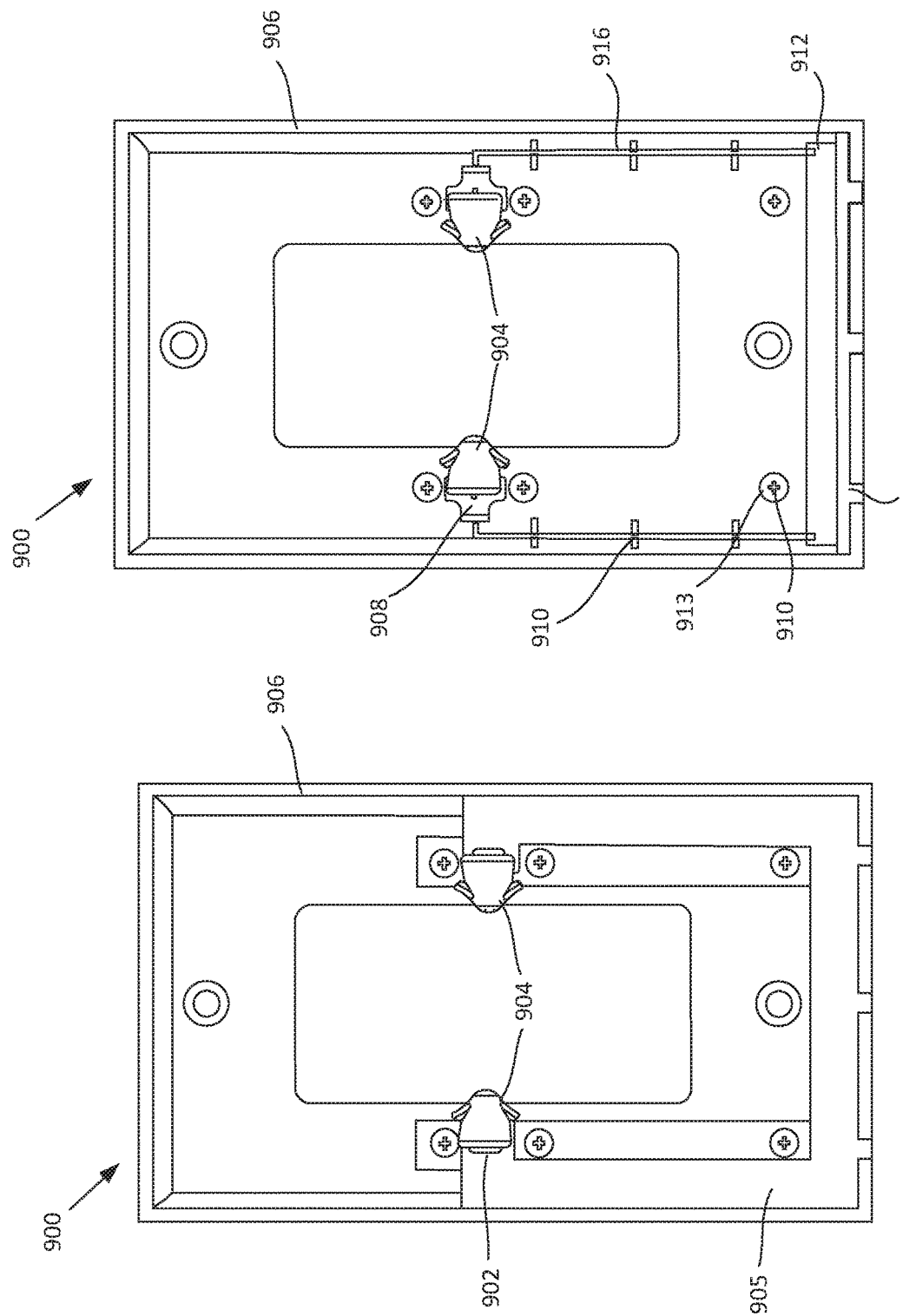
FIGS. 9A and 9B show rear views of an illustrative active cover plate for use with an electrical receptacle, according to one example of principles described herein.
Figure 10:
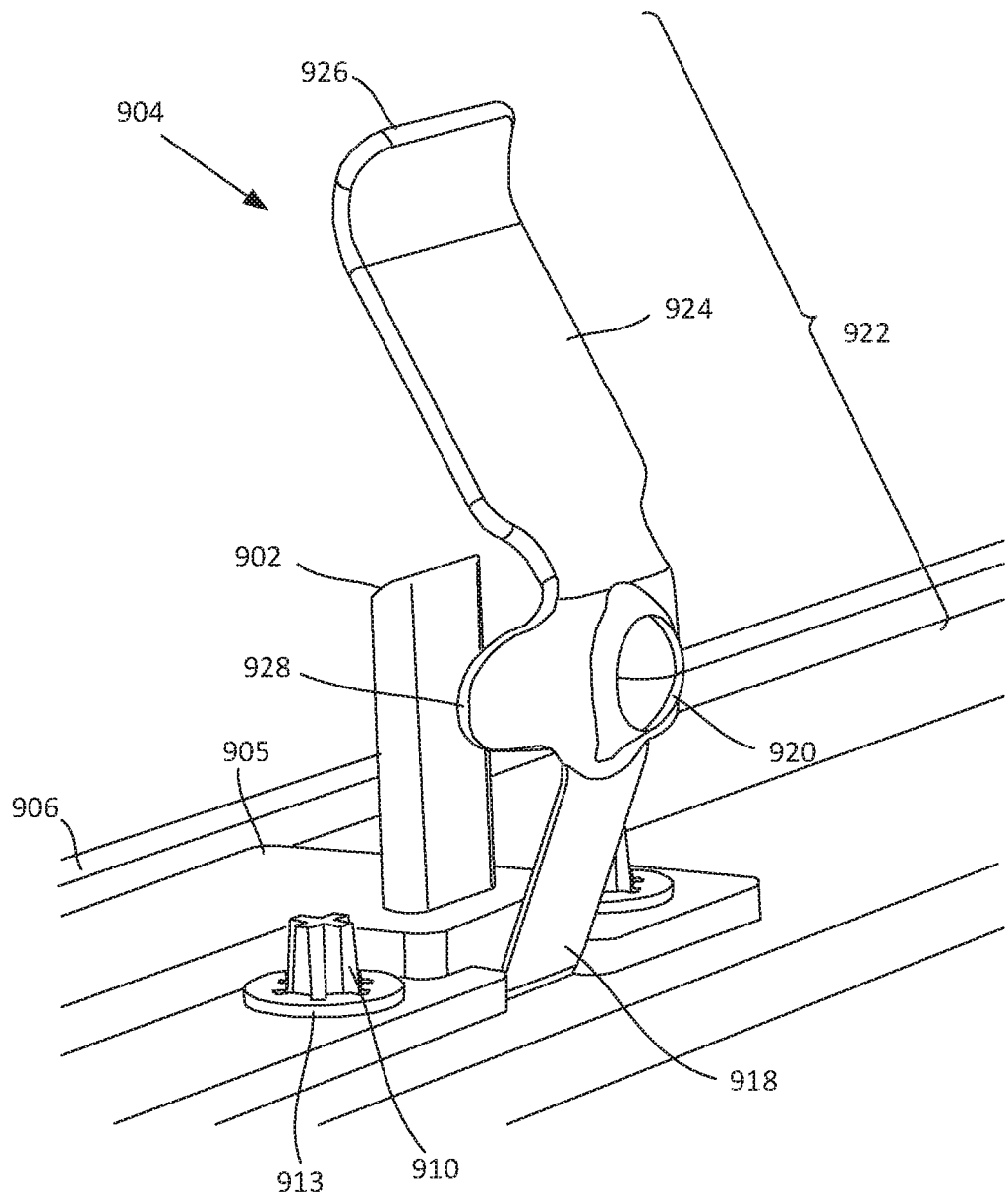
FIG. 10 shows a perspective view of an illustrative spring clip mounted to the back of a face plate, according to one example of principles described herein.

FIGS. 9A, 9B, and 10 show views of an illustrative active cover plate (900) for use over an electrical receptacle such as a décor outlet receptacle. The principles described can be applied to a wide variety of active cover plates including active cover plates for duplex outlets and light switches. In this example, the active cover plate (900) includes spring clips or "power extractors" (904) with non-conductive portions (922, FIG. 10) that extend significantly beyond the electrical contact point (see e.g. FIG. 10). The active cover plate (900) in this example includes two opposing spring clips (904) connected to a face plate (906). However, there can be any number of spring clips that are arranged in a variety of locations to make desired contact with screws and screw terminals on the sides of outlets, light switches, or other electrical receptacles. The bases (908) of the spring clips are sandwiched between the sandwich/back plate (905) and the rear of the face plate (906). In this example, the non-conductive portion or ramp (922, FIG. 10) is connected to the lower conductive portion (918, FIG. 10) of the spring clips (904) by a rivet (920, FIG. 10). In addition to securing the ramp (922, FIG. 10) to the conductive portion (920, FIG. 10), the head of the rivet also serves as an electrical contact which forms an electrical connection with the screws or terminals on the body of the receptacle. In one example, the rivets (920, FIG. 10) may be held in place by swaging/expanding the backside of the rivet over/in an aperture in the lower conductive portion.

In this embodiment, there is a wall or tab (902) behind each of the spring clips (904) that limits extreme motion of the spring clip (904) and prevents conductive portions of the spring clip (904) from making undesirable contact with exterior material. The walls or tabs (902) extend rearward from the sandwich plate (905).

FIG. 9B is a rear view of the active cover plate (900) with the back plate/sandwich plate (905, FIG. 9A) removed. This shows the bases (908) of the spring clips (904), circuit board (912), and conductor (916) connecting the spring clips (904) to the circuit board (912). In this example, the conductor (916) is a wire that is connected to the base (908) of the spring clip (904) by crimping, soldering, or other suitable technique. The wire (916) is routed through a number of wire brackets (910) that are molded into the face plate (906). The face plate (906) also includes alignment posts and press nut posts (910).

FIG. 10 shows a perspective view of an illustrative spring clip (904) mounted to the back of a face plate (906). The walls or tabs (902) are located between the spring clips/prongs (904) and the exterior edges of the face plate (906). The heads of the rivets (920) on the prongs/spring clips (904) are the most inwardly extending portion of the spring clips (904).

The non-conductive portion (922) of the spring clips (904) can be formed from a variety of insulating materials, including polymers, ceramic, composite materials, or other material. In this example the non-conductive portion (922) is formed from a flexible resilient polymer material such as nylon. The non-conductive portion (922) can be formed in a variety of ways, including injection molding.

The non-conductive portion (922) is attached to the terminal end of the conductive portion (918) by the rivet (920). Additionally or alternatively, a number of other techniques can be used to attach the non-conductive portion (922). For example, the non-conductive portion (922) may be joined to the conductive portion (918) by adhesive, heat welding, press fit, snap fit, induction welding (for specific types of materials), ultrasonic welding/staking, and other suitable techniques. These techniques can be used separately or in combination. For example, the rivet joint may be supplemented by interaction of the conductive portion (918) with molded features on the non-conductive portion (922). As discussed above, the riveted connection between the non-conductive portion (922) and conductive portion (918)

has a number of advantages, including using the head of the rivet (920) as a contact point and the swaging of the rivet (920) into/over a hole in the conductive portion (918) to ensure that there is a reliable electrical connection between the rivet (920) and the conductive portion (918).

The non-conductive ramp portion (922) can serve a variety of functions. In this example, the non-conductive portion (922) includes an angled end portion (924) ("ramp"), a terminal curve (926) and two wings (928) that extend to either side of the central body/rivet (920) of the spring clip (904). First, the non-conductive portion (922) serves as a guide that directs the cover plate (900, FIG. 9A) into accurate positioning over the outlet/receptacle body. Where there are opposing spring clips (904), the angled ramp (924) guides and centers the cover plate (900) over the outlet/receptacle body. In situations where the cover plate (900, FIG. 9A) is misaligned such that the non-conductive portion (922) contacts the wall of an enclosure, the terminal curve/end (926) ensures that the spring clip (904) glides smoothly along the wall. The spring force of the conductive portion (918) and non-conductive portion (922) gently guides the cover plate (900, FIG. 9A) into place with increasing accuracy as the cover plate (900, FIG. 9A) is pushed closer to its final position.

Second, the non-conductive portion (922) is contoured so that the electrical contact (the head of the rivet (920)) doesn't have any exposed edges that may snag on the outlet body, wires, or screws. Third, the wings (928) allow for the spring clip (904) to glide up and down over the screws and screw terminals. As discussed above, there may be vertical misalignment between the active cover plate (900, FIG. 9A) and the receptacle body during the installation process. To achieve the desired alignment and to allow the active cover plate (900, FIG. 9A) to fit around the face of the receptacle body and to align the fastener aperture in the cover plate (900, FIG. 9A) with the threaded hole in the outlet body, the active cover plate (900, FIG. 9A) may be slid up and down. The wings (928) and smooth contours of the spring clip (904) are created by molding the central portion of the non-conductive portion (922) to match/mate with the surface of the installed rivet (920). These wings (928) and smooth contours allow the spring clip (904) to glide smoothly over the screws. The wings (928) progressively bend the spring clip (904) backwards to lift it over obstacles (such as screw heads and contours of the receptacle body).

The characteristics of the spring clip (904) shown in FIG. 10 include an angled conductor portion (918), with the angle of the conductor portion (918) directing the rivet (920) inward toward the outlet body. The rivet (920) is the most prominent portion of the spring clip (904) and extends farthest inward toward the outlet body. Both the wings (928) and the main ramp (924) are angled away from the outlet body, with the base of the wings (928) and ramp (924) joining with the center of the non-conductive portion (922) containing the rivet (920) and the ends extending away from the outlet body.

The conductive portion (918) in this example includes simple curves where the conductive portion (918) passes under the sandwich plate (905) and a simple curve where the conductive portion (918) contacts/joins the non-conductive portion (922). The conductive portion (918) may be made from a variety of materials including steels, copper, and alloys thereof. For example, the conductive portion (918) may be formed from a beryllium copper alloy. Alternatively the conductive portion (918) may be formed from spring steel with a nickel coating to increase its electrical conductivity and prevent corrosion. In some embodiments, the conductive portion (918) may be coated or covered by an insulating layer. The insulating layer may be created in a variety of ways, including a sleeve, a dipped layer, a brushed layer, a chemically deposited layer, or other technique.

Figure 11:
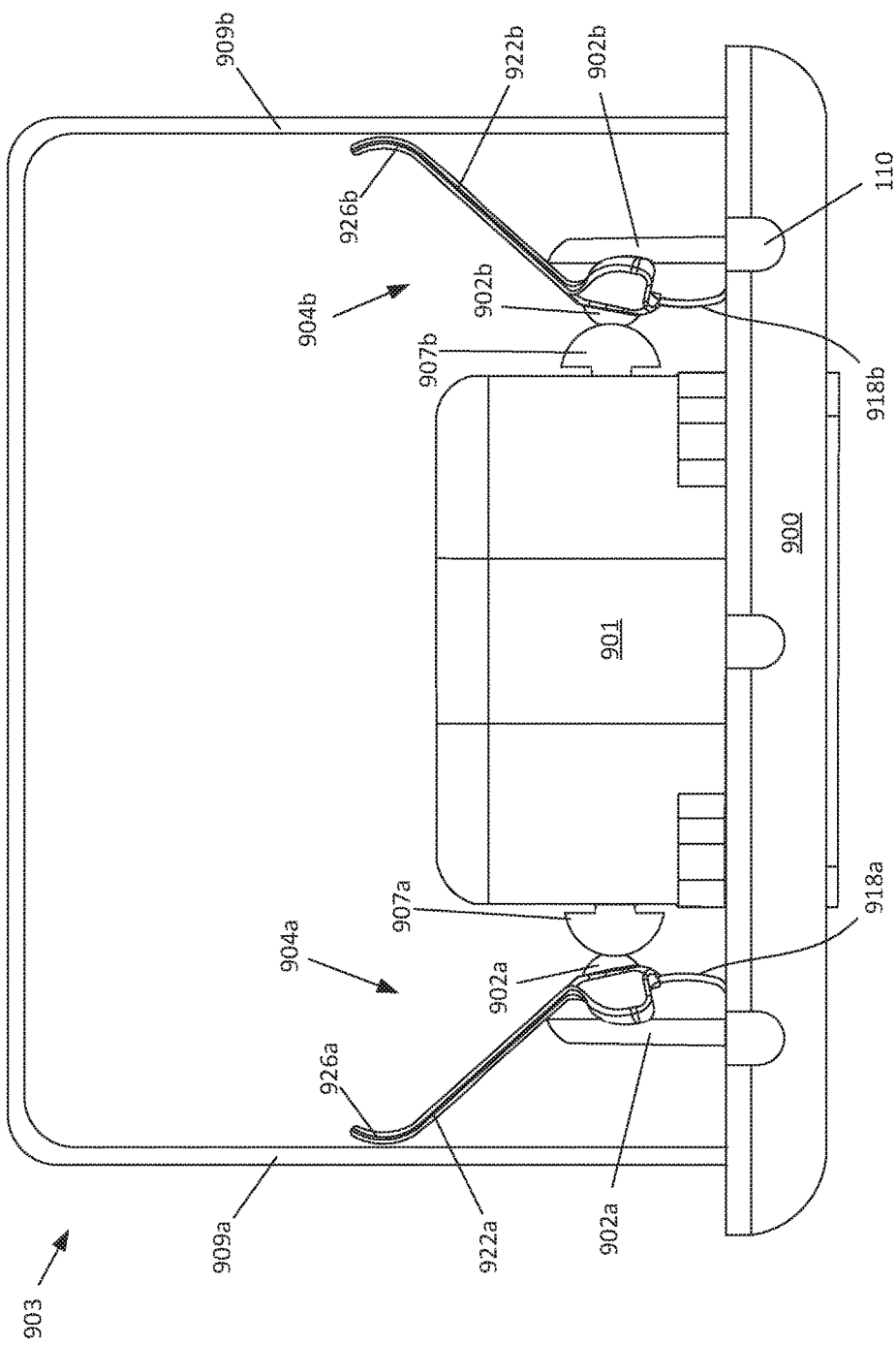
FIG. 11 shows a partially cutaway bottom view of an illustrative active cover plate mounted over an outlet receptacle mounted in a receptacle box, according to one example of principles described herein.

FIG. 11 shows a partially cutaway bottom view of an illustrative active cover plate (900) mounted over an outlet receptacle (901) mounted in a receptacle box (903). In this example, the terminal ends (926a, 926b) of the non-conductive portions (922a, 922b) contact the inner face of walls (909a, 909b) of the box (903). This provides a number of benefits. First, the contact between the terminal ends (926a, 926b) of the spring clips (904a, 904b) and the walls (909a, 909b) may provide increased resistance to further deformation. This can prevent large deformation/bending angles that could permanently deform the conductive portion (918a, 918b) of the spring clip (904a, 904b). Second, the contact with the side walls (909a, 909b) can increase the amount of contact pressure between the rivet heads (902a, 902b) and the screws (907a, 907b), thereby increasing the reliability of the electrical connection between the spring clips (904a, 904b) and the screws (907a, 907b). As discussed above, the non-conductive portion (922a, 922b) may be formed from a resilient polymer such as nylon. This allows for significant deformation/spring action by the non-conductive portion (922a, 922b). For example, if the gap between the outlet (901) and inner wall (909a, 909b) of the receptacle box (903) is particularly tight, the non-conductive portion (922a, 922b) can be almost straight.

Additionally, as shown in FIG. 11 and described above, the walls or tabs (902a, 902b) can limit the motion of the spring clips (904a, 904b) and prevent the rear side of the spring clips (904a, 904b) from contacting conductive materials. FIG. 11 shows the spring clips (904a, 904b) contacting the walls (902a, 902b) as the spring clips (904a, 904b) are bent outward by the screws. The walls (902a, 902b) may have a variety of heights. For example, the walls (210a, 210b, 415, 550a, 550b, 550c, 702) may be taller than the spring clips as shown in FIGS. 2C, 4C, 5B, 5C, and 8 or may be shorter than the spring clips as shown in FIGS. 9A, 10 and 11. The walls may be molded directly in the face plate, molded features on a sandwich plate/backplate, or may be separately attached. The walls may be wider than the spring clip as shown in FIGS. 2C, 4C, 5B, 5C, and 8 or may be narrower than the spring clips as shown in FIGS. 9A, 10 and 11. Further, the walls may be used in conjunction with a variety of different types of spring clips/prongs. For example, the walls may be used with spring clips/prongs that may be uninsulated (see e.g. 208a, 208b, FIG. 2C, FIG. 3; 548a, 548b, 548c, FIGS. 5B, 5C; 704, FIG. 7A; 708, FIG. 8) or insulated (see e.g. 425, FIG. 4A; 407a, 407b, FIG. 4C; 904, FIG. 10).

Additionally, the spring clips may be designed to contact walls of receptacle boxes as shown in FIG. 11. In general, contacting walls, either walls that extend from the active cover plate or walls of the receptacle boxes, limit the motion of the spring clip to prevent damage to the spring clip and provide additional force that presses the spring clip more tightly against the outlet body.

Figure 12:
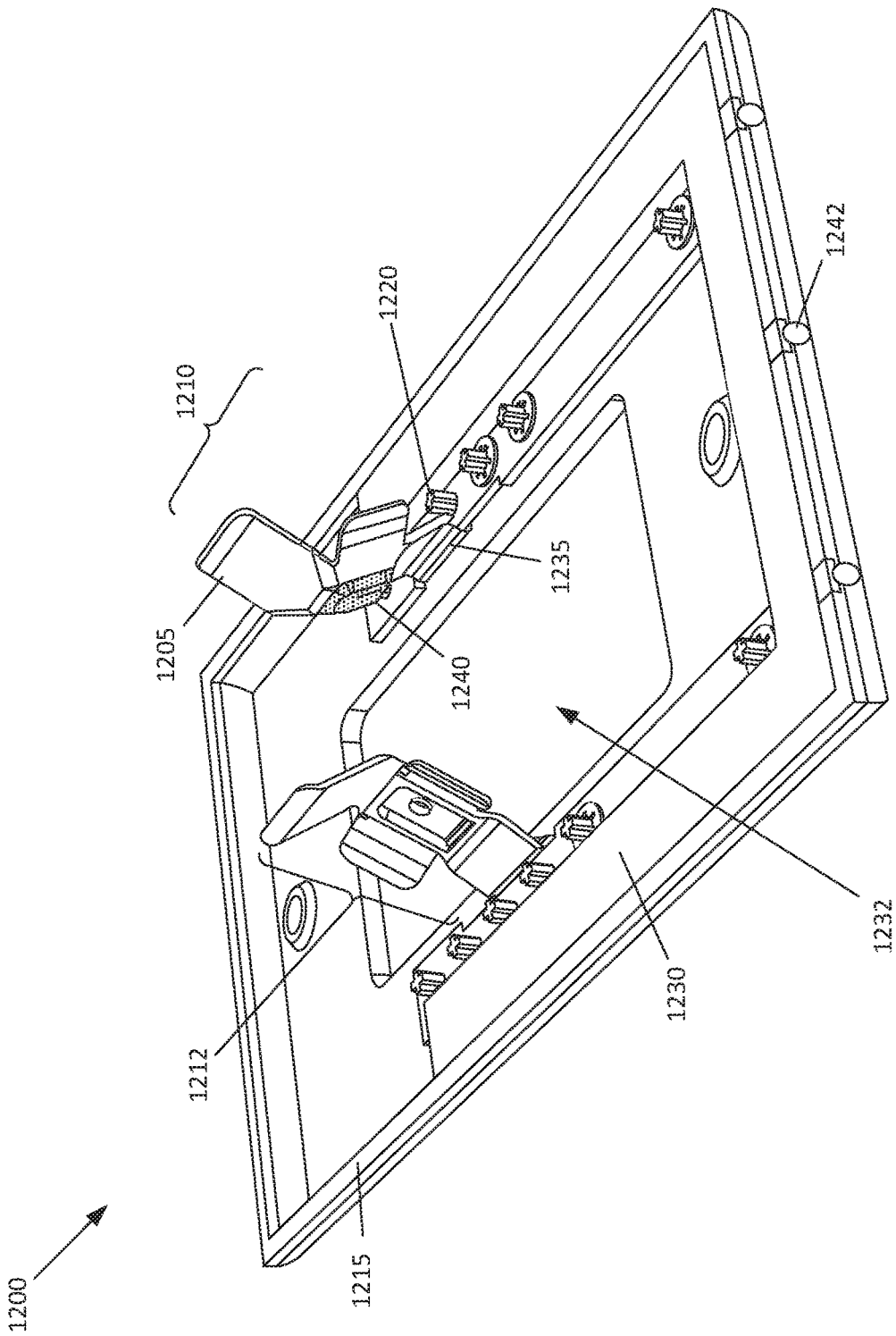
FIG. 12 is a perspective view of an active cover plate, according to one example of principles described herein.

FIGS. 12, 13, 14A, and 14B show an illustrative example of an active cover plate (1200) with spring clips (1210, 1212) that fit over posts (1220) and are sandwiched between a sandwich plate/back plate (1230). In some examples, the spring clips/prongs (1210, 1212) are adjustable vertically and in width. FIG. 12 is a rear perspective view of the active cover plate (1200) for a "decora" style outlet body. However, the principles described could be used in conjunction with a wide range of spring clips and receptacle bodies.

The active cover plate (1200) includes a face plate (1215) with an aperture (1232) through which the outlet receptacles in the outlet body are accessible. The active cover plate (1200) includes spring clips (1210, 1212) and a sandwich plate (1230). The spring clips (1210, 1212) include a compliant conductive portion (1235) with one end that is sandwiched between the face plate (1215) and the sandwich plate (1230). In this example, a rectangular rivet (1240) and a non-conductive portion (1205) are connected to an opposite terminal end of the compliant conductive portion (1235). The spring clips (1210, 1212) and sandwich plate (1230) could be fastened to the face plate (1215) using a number of techniques, including heat staking or using fasteners that are pressed over the posts (1220). When placed over an outlet body, the rivets (1240) on the spring clips (1210, 1212) contact the electrified screw terminals on the sides of the outlet body to extract power from the building wiring/outlet body. Although this active cover plate (1200) is only illustrated with two opposing spring clips (1210, 1212), an active cover plate may have any number of spring clips.

The spring clips (1210, 1212) may be placed over different posts (1220) to position/secure the spring clips (1210, 1212) in the desired location on the back of the face plate (1215). The spring clips (1210, 1212) are electrically connected to a load in the active cover plate (1200). In this example, the load is a circuit board that includes three light emitting diodes (LEDs) that shine downward and out of the active cover plate (1200) through three apertures (1242).

FIGS. 13, 14A and 14B are additional views of a spring clip (1212) that could be used in conjunction with the cover plate (1200, FIG. 12) shown in FIG. 12. FIG. 13 shows a front perspective view of a spring clip (1212) that includes a conductive portion (1235) and a non-conductive portion (1205). The non-conductive portion (1205) has a main ramp (1252), side wings (1254), and a terminal curve (1250). The non-conductive portion (1205) may have a variety of purposes including preventing the conductive portion (1235) from undesirably contacting wires, the electrical box, or other materials. The non-conductive portion (1205) may also prevent arcing between resilient conductors and external conductors.

The non-conductive portion (1205) of the spring clip (1212) can be formed from a variety of insulating materials, including polymers, ceramic, composite materials, or other material. In this example, the non-conductive portion is formed from a flexible resilient polymer material such as nylon. The non-conductive portion (1205) can be formed in a variety of ways, including injection molding.

In this example, the non-conductive portion (1205) is attached to the terminal end of the conductive portion (1235) by the rivet (1240). Additionally or alternatively, a number of other techniques can be used to attach the non-conductive portion (1205) to the conductive portion (1235). For example, the non-conductive portion (1205) may be joined to the conductive portion (1235) by adhesive, heat welding, press fit, snap fit, induction welding (for specific types of materials), ultrasonic welding/staking, and other suitable techniques. These techniques can be used separately or in combination. For example, the rivet joint may be supplemented by molded features on the non-conductive portion (1205). As discussed above, the riveted connection between the non-conductive portion (1205) and conductive portion (1235) has a number of advantages, including using the head of the rivet (1240) as a contact point and the swaging of the rivet (1240) into/over a hole in the conductive portion (1235) to ensure that there is a reliable electrical connection between the rivet (1240) and the conductive portion (1235).

The non-conductive portion (1205) can serve a variety of functions. As discussed above, the non-conductive portion (1205) includes an angled end portion or a main ramp (1252), a terminal curve (1250) and two side wings (1254) that extend to either side of the central portion of the spring clip (1212). The non-conductive portion (1205) serves as a guide that directs the active cover plate (1200, FIG. 12) into accurate positioning over an outlet/switch body. Where there are opposing spring clips (1210, 1212, FIG. 12), the angled ramp (1252) guides and centers the active cover plate (1200, FIG. 12) over the outlet/switch body. In situations where an active cover plate (1200, FIG. 12) is misaligned or has less clearance, the non-conductive portion (1205) may contact the wall of an electrical box. The terminal curve (1250) ensures that the spring clip (1212) glides smoothly along the wall. The spring force of the conductive portion (1235) and ramp geometry of the non-conductive portion (1205) guides the active cover plate (1200, FIG. 12) into place with increasing accuracy as the active cover plate (1200, FIG. 12) is pushed closer to its final position.

The non-conductive portion (1205) is contoured so that the electrical contact (the head of the rivet (1240)) does not have any exposed edges that may snag on the outlet body, wires, or screws. The side wings (1254) allow for the spring clip (1212) to glide up and down over the screws and screw terminals. As discussed above, there may be vertical misalignment between the active cover plate (1200, FIG. 12) and the receptacle body/screw terminals during the installation process. To achieve the desired alignment, to allow the active cover plate to fit around the face of the receptacle body and to align the fastener aperture in the cover plate with the threaded hole in the outlet body, the active cover plate may be slid up and down with respect to the receptacle body. For example, a user may have engaged the active cover plate too low on the receptacle body and needs to move it up to align the cover plate with the outlet body. The side wings (1254) and smooth contours of the spring clip (1212) created by molding the central portion of the non-conductive portion (1205) to match/mate with the surface of the installed rivet (1240) allow the spring clip (1212) to glide smoothly over the screws. The side wings (1254) progressively bend the spring clip (1212) backwards to lift it over obstacles (such as screw heads and contours of the receptacle body).

In this example, the head of the rivet (1240) is rectangular, with the major axis of the rectangular head oriented to provide contact with screw terminals/screws that have a variety of depths (distances from the front face of the outlet body). The narrow width of the rivet head (1240) reduces the likelihood of arcing if the screw terminal has been divided into two separate electrical elements by removing the brakeout in the middle of the screw terminal. This geometry is only one example. A variety of other electrical contact geometries could be used. Additionally, the flexible conductive portion (1235) is angled inward to present the rivet head (1240) at a desired angle and to provide for a large range of motion of the spring clip (1212) outward. This accommodates receptacle bodies of varying width and screws that are screwed outward from the screw terminals.

FIG. 14A is a side view of the spring clip (1212) that shows various components of the flexible conductive portion (1235). In this example, the flexible conductive portion (1235) includes a base portion (1262), an "S" shaped curve (1264) connected to the base portion (1262), and an angled portion (1263). The angled portion (1263) directs the rivet (1240) inward toward the outlet body. The rivet (1240) is the most prominent portion of the spring clip (1212) and extends farthest inward toward the outlet/receptacle body. Both the side wings (1254) and the main ramp (1252) are angled away from the outlet body, with the base of the side wings (1254) and ramp (1252) joining with the center of the non-conductive portion (1205) containing the rivet (1240) and the ends of the side wings (1254) and ramp (1252) extending away from the outlet body.

The flexible conductive portion (1235) may include a variety of compound curves that increase its flexibility and resilience in allowing the motion/travel of the spring clip (1212) toward and away from the outlet/switch body (width adjustment). One example of this is the "S" shaped curve (1264). The "S" shaped curve (1264) serves several functions. The "S" shaped curve (1264) provides increased flexibility to the spring clip (1212) by providing two separate curvatures that bend. The "S" shaped curve (1264) also allows for more bending/travel of the spring clip (1212) before permanent deformation of the conductive portion (1235) because the bending is distributed over two locations rather than one.

FIG. 14B shows a rear perspective view of the spring clip (1212). The end of the conductive portion (1235) has a reduced width and interfaces with the non-conductive portion (1205). The center of the conductive portion (1235) with reduced width has an aperture through which the rear of the rivet (1240) passes. The rear of the rivet (1240) is then swaged (mushroomed) over the aperture as shown in FIG. 14B to make the connection between the flexible conductive portion (1235) and the non-conductive portion (1205). In this example, the nonconductive portion (1205) also includes a skirt (1260) that covers the rear of the conductive portion (1235) and prevents undesirable electrical contact and arcing.

The width of the conductive portion may create a significant resistance to twisting or bending forces that would tend to undesirably move the spring clip back and forth toward the top/bottom of the active cover plate. This undesired motion tends to occur when the active cover plate is being moved vertically with respect to the outlet/switch body and the spring clip is moving over the screws/screw terminals. The relatively high stiffness of the spring clip in this direction prevents twisting/deformation during this operation, while the much lower stiffness of the spring clip in the perpendicular direction (motion toward and away from the screw terminals) allows for the spring clip to move smoothly over the screws/screw terminals.

FIG. 14B also shows how the spring clip (1212) is secured to the face plate (1215) and makes an electrical connection with the wire (1244). The spring clip (1212) includes a base portion (1262) with a number of apertures. The apertures are configured to receive various alignment and anchor features that are molded into the face plate (1215). As discussed above, there are number of posts (1248) in the face plate (1215). In one embodiment, the apertures in the base portion (1262) are configured to accept two adjacent posts (1248). In this example, the spring clip (1212) has been placed over the second and third posts (1248-2, 1248-3). By selecting which posts (1248) the apertures are placed over, the vertical position of the spring clip (1212) can be selected during manufacturing without having to manufacture different face plates (1215), spring clips (1212) or sandwich plates. The connection between the wire (1244) and the spring clip (1212) can be made using a wire attach feature (1266) on the base portion (1262). The wire attach feature (1266) may include a slot into which a stripped conductor can be placed. The conductor can then be soldered to the wire attach feature (1266). The wire (1244) can be cut to the desired length or can be long enough to accommodate all vertical positions of the spring clips (1212).

Figure 15:
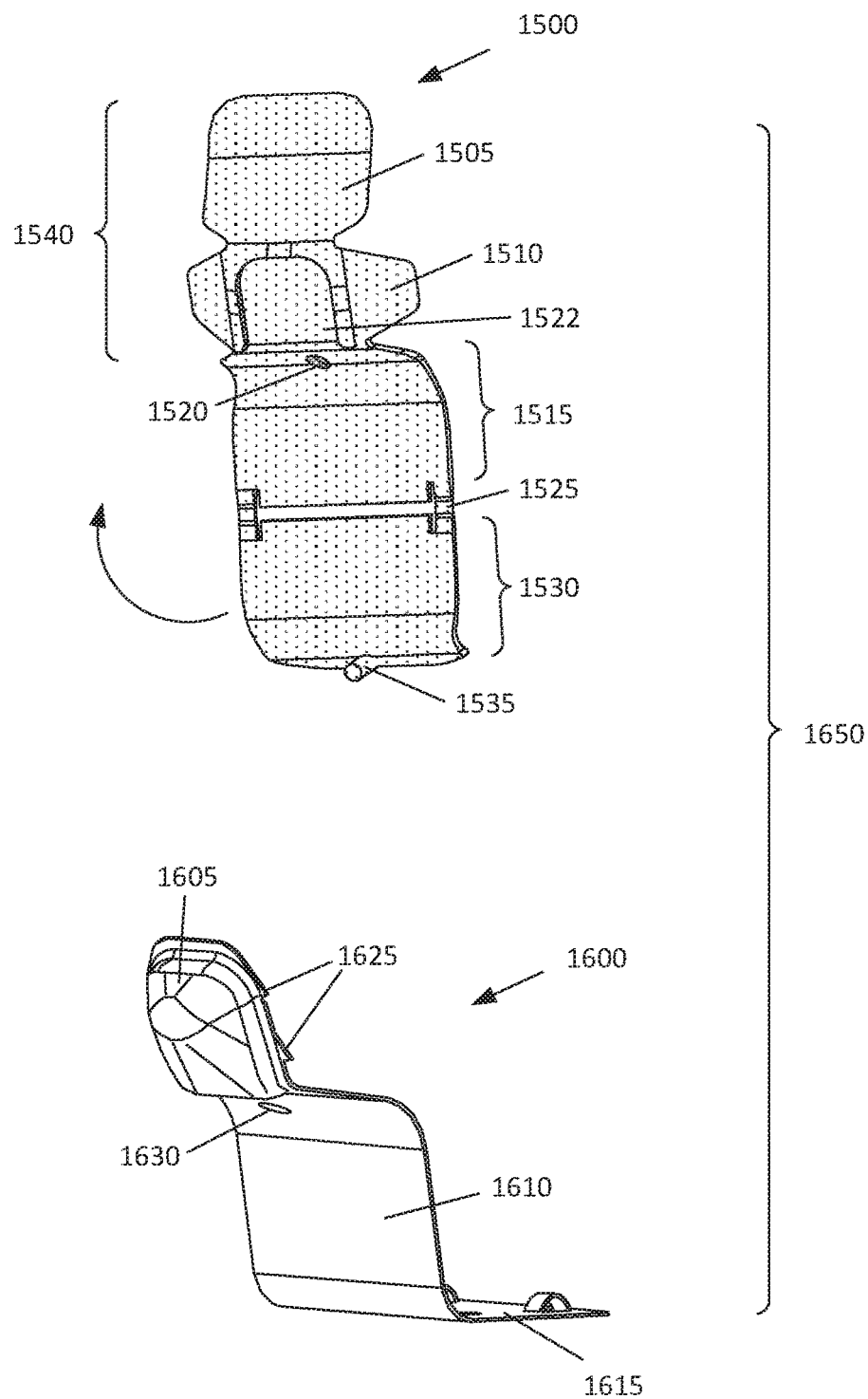
FIG. 15 shows a conductor and insulator for a spring clip, according to one example of principles described herein.

FIG. 15 is an exploded assembly view of a spring clip (1650) that shows an illustrative conductor (1600) and insulator (1500) that fits over the conductor (1600). In this example, the insulator (1500) is formed from a single piece of electrical insulating material and includes an upper portion (1540), a rear insulating portion (1515), and a front insulating portion (1530). The upper portion (1540) includes a main ramp (1505), and two side ramps (1510). It also includes a cavity (1522) to receive the contact (1605). In this embodiment, the rear insulating portion (1515) is directly connected to the upper portion (1540). The rear insulating portion (1515) is connected to the front insulating portion (1530) by a flexible portion (1525). For example, the flexible portion (1525) may be a joint or a living hinge. In one example, the rear insulating portion (1515) includes an aperture (1520) that is configured to receive a post (1535) on the front insulating portion (1530).

The front insulating portion (1530) is folded upward as shown by the curved arrow. In this example, the cavity (1522) in the upper portion (1540) of the insulator (1500) slips over the contact (1605) and the barbs (1625) engage with the sides of the cavity (1522) to secure the insulator (1500) onto the conductor (1600). The front insulating portion (1530) is then rotated about the joint (1525) until the post (1535) fits through the aperture (1630) in the flexible conducting portion (1610) and through the aperture (1520) in the rear insulating portion (1515). The post (1535) is then secured in place. For example, the post (1535) may be pressed so that it expands to fill the apertures (1520, 1630) and secure the front insulating portion (1530) to the rear insulating portion (1515) and additionally secure the insulator (1500) to the conductive element (1600).

Figure 16A:
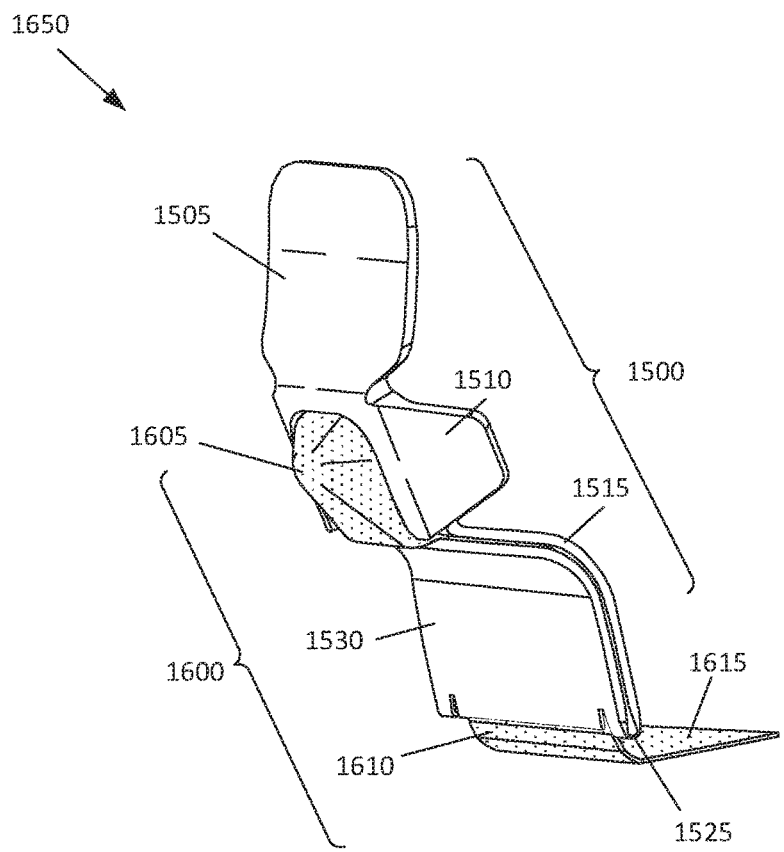
FIGS. 16A and 16B are a perspective view and top view of a spring clip, respectively, according to one example of principles described herein.
Figure 16B:
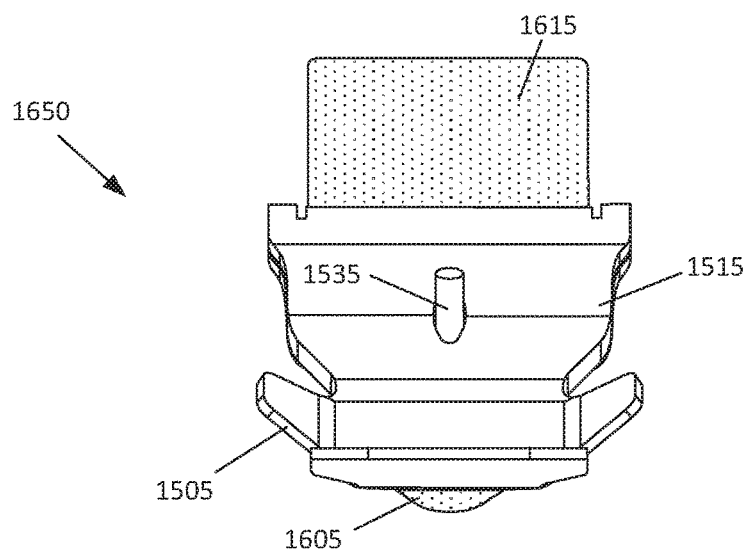

FIGS. 16A and 16B are a perspective view and top view, respectively, of the illustrative spring clip (1650) shown in FIG. 15. FIG. 16A shows a perspective view of a spring clip (1650). In this view, the hood/insulator (1500) is installed over the conductor (1600), so that the ramps (1505, 1510) allow the contact (1605) to move into place over the screw terminal. The front insulating portion (1530) covers the front of the flexible conductive portion (1610) and the rear insulating portion (1515) covers the rear of the flexible conductive portion (1610). Thus, the flexible conductive portion (1610) is sandwiched between the front insulating portion (1530) and the rear insulating portion (1515).

FIG. 16B shows a top view of the spring clip (1650), showing the post (1535) extending through the apertures and out of the rear insulating portion (1515). The post (1535) is then secured in place by any of a number of means, including swaging, compressing, adhesive, or any other suitable means. Once it is secured in place, the front insulating portion (1530, FIG. 16A) and the rear insulating portion (1515) sandwich the flexible conductive portion (1610, FIG. 16B) between them.

Thus, in a first exemplary embodiment, a system in accordance with the present invention may comprise an active cover plate including one or more of the following structures: (1) a face plate; (2) an electrical load; (3) at least one clip extending rearward from the faceplate, the clip comprising one or more of: a contact; a resilient strip supporting the contact, wherein the contact is joined to the resilient strip and passes through the resilient strip; and a rear insulator covering a rear side of the contact; and (4) an electrical connection between the clip and the electrical load.

Such an active cover plate may also include one or more structures set forth above combined with one or more of: (1) the resilient strip comprising a base, a bend, and an upright portion; (2) the rear insulator moving with respect to the main upright portion when the main upright bends; (3) the rear insulator covering at least a portion of the bend and the upright portion; (4) a back plate, wherein the rear insulator comprises an integrally molded feature of the back plate; (5) the integrally molded feature comprising a wall; (6) the integrally molded feature comprising a hinged connection to the back plate; (7) a back plate, wherein the resilient strip comprises a base sandwiched between the back plate and the face plate; (8) the face plate comprising posts extending rearward and wherein the back plate and base comprise apertures to accept the posts, the posts securing the base of the resilient strip between the face plate and the back plate; (9) the posts being compressed to secure the back plate to the face plate; (10) the contact comprising a major axis and a minor axis, wherein the major axis is at least 20% greater than the minor axis; and (11) the major axis being substantially perpendicular in at least one direction to a rear plane of the face plate.

In a second exemplary embodiment, a system in accordance with the present invention may comprise an active cover plate including one or more of the following structures: (1) a face plate; (2) an electrical load; (3) a clip extending rearward from the face plate to interface with screw terminals of a receptacle body, wherein the clip comprises one or more of (a) a contact, (b) a conductor connected to the contact, (c) a front insulator, and (d) a rear insulator, wherein the conductor is disposed between the front insulator and the rear insulator; and (4) an electrical connection between each of the contact and the electrical load.

Such an active cover plate may also include one or more structures set forth above combined with one or more of: (1) the rear insulator being joined to the front insulator; (2) the rear insulator covering a rear of the contact; (3) a back plate, wherein the rear insulator comprises a molded feature of the back plate; and (4) the conductor being sandwiched between the front insulator and rear insulator.

In a third exemplary embodiment, a system in accordance with the present invention may comprise an active cover plate including one or more of the following structures: (1) a faceplate comprising one or more of (a) three spaced apertures along one edge and posts extending rearward from the faceplate, (b) a load comprising at least three light emitting diodes, wherein light emitted from the three light emitting diodes shine through the three spaced apertures along the one edge of the faceplate, and (c) a light sensor, wherein the light sensor receives ambient light through the aperture on the face of faceplate; (2) a pair of opposing clips extending rearward from the faceplate to interface with opposing screw terminals of an outlet receptacle body, wherein the pair of opposing clips are configured to bend outward as the clips interface with the opposing screw terminals, wherein the each of the clips comprise a contact configured to electrically contact one of the opposing screw terminals; (3) electrical connections connecting each of the contacts and the load; and (4) a back plate, wherein each of the clips fits over posts extending rearward from the faceplate and the back plate fits over posts to sandwich the clips between the faceplate and the back plate, wherein the posts are compressed to secure the prongs and back plate to the face plate.

Such an active cover plate may also include one or more structures set forth above combined with one or more of: (1) a light pipe, wherein the light pipe is configured to fit into the three spaced apertures and direct light from the at least three light emitting diodes out through the three space apertures; (2) each clip comprising a main ramp configured to guide the spring clips around the outlet receptacle body, wherein the main ramps are configured to contact a wall as the clips bend outward and interface with the opposing screw terminals, wherein contact with the wall by the main ramp increases contact pressure between the contact and the screw terminal; (3) the wall comprising an interior wall of an outlet receptacle box; (4) the wall comprising a wall extending from the rear of the back plate; (5) the wall comprising a hinged wall integrally molded in the back plate; (6) each of the clips comprising rear insulation disposed over conductive portions of the clip on an opposite side of the clip from the contact; (7) the rear insulation being not statically joined to the clip and wherein the rear insulation insulating cover and the clip slide with respect to each other as the clip bends outward; and (8) each of the clips further comprising a front insulator and a rear insulator, wherein the electrical connections are sandwiched between the front insulator and rear insulator.

In a fourth exemplary embodiment, a wall-plate system may extend in longitudinal, lateral, and transverse directions that are orthogonal to one another and may include one or more structures set forth above combined with one or more of: (1) a face plate comprising a front, a back, and at least one outlet aperture, wherein the outlet aperture extends through the face plate in the transverse direction; (2) a back plate abutting the back of the face plate; (3) electronic circuitry comprising a light; (4) at least one spring clip connected to the face plate and extending rearward away from the back of the face plate in the transverse direction, the at least one spring clip comprising at least one first portion of conductive material extending rearward away from the back of the face plate in the transverse direction; (5) the least one spring clip resiliently deflecting between a neutral position and a deflected position located outboard of the neutral position in the lateral direction; (6) at least one insulator positioned outboard of the at least one first portion of conductive material in the lateral direction; (7) the at least one insulator tracking (e.g., moving back and forth with) the at least one spring clip as the at least one spring clip deflects between the neutral position and the deflected position; and (8) at least one second portion of conductive material sandwiched between the face plate and the back plate and extending to electrically connect the at least one first portion of conductive material to the electronic circuitry.

Such a wall-plate system may also include one or more structures set forth above combined with one or more of: (1) the face plate further comprising a rectangular outer perimeter forming lengthwise and widthwise extremes of the wall-plate plate in the longitudinal and lateral directions, respectively; (2) the back plate being circumscribed by the rectangular outer perimeter of the face plate; (3) the face plate further comprising one or more of (a) an edge extending in the lateral direction to form one extreme of the wall plate system and (b) a plurality of apertures extending in the longitudinal direction through the edge; (4) the light comprising a plurality of light sources; (5) at least one light source of the plurality of light sources being positioned proximate each aperture of the plurality of apertures; (6) the plurality of apertures consisting of three apertures; (7) each light source of the plurality of light sources comprising an LED; (8) the at least one insulator being formed of a polymeric material; (9) the at least one spring clip comprising a first spring clip and a second spring clip; (10) the at least one insulator comprising a first insulator and a second insulator; (11) the first spring clip being positioned outboard of the at least one outlet aperture and inboard of the first insulator in the lateral direction; (12) the second spring clip being positioned outboard of the at least one outlet aperture and inboard of the second insulator; (13) the first and second spring clips being spaced from one another in the lateral direction and located on opposite sides of the at least one outlet aperture; (14) the first insulator tracking the first spring clip as the first spring clip deflects between the neutral and deflected positions corresponding thereto; (15) the second insulator tracking the second spring clip as the second spring clip deflects between the neutral and deflected positions corresponding thereto; (16) the at least one spring clip comprising a base portion and a contact portion and wherein (a) the contact portion extends rearward away from the back of the face plate in the transverse direction and (b) the base portion abuts the back of the face plate; (17) the base portion of the at least one spring clip being sandwiched between the back plate and the face plate; (18) the back of the face plate comprising at least one post extending rearward in the transverse direction; (19) the back plate comprising at least one first aperture extending in the transverse direction therethrough; (20) the base portion of the at least one spring clip comprising at least one second aperture extending in the transverse direction therethrough; (21) a post of the at least one post extending in the transverse direction through the at least one first aperture and the at least one second aperture to secure the face plate, back plate, and at least one spring clip together; (22) the at least one outlet aperture being shaped to admit a face of a duplex outlet therethrough; and (23) the at least one outlet aperture being shaped to admit a face of a décor outlet therethrough.

In a fifth exemplary embodiment, a wall-plate system may extend in longitudinal, lateral, and transverse directions that are orthogonal to one another and may include one or more structures set forth above combined with one or more of: (1) a face plate comprising a front, a back, and at least one outlet aperture extending therethrough in the transverse direction; (2) the face plate further comprising an edge and at least one light aperture, wherein the edge extends in the lateral direction to form one extreme of the wall-plate system and the at least one light aperture extends in the longitudinal direction through the edge; (3) electronic circuitry comprising at least one light source positioned proximate the at least one light aperture; (4) at least one spring clip connected to the face plate and extending rearward away from the back of the face plate in the transverse direction, the at least one clip comprising at least one first portion of conductive material extending rearward away from the back of the face plate in the transverse direction; (5) the least one clip resiliently deflecting between a neutral position and a deflected position located outboard the neutral position in the lateral direction; (6) at least one insulator positioned outboard of the at least one first portion of conductive material in the lateral direction; (7) the at least one insulator tracking (e.g., moving back and forth with) the at least one clip as the at least one clip deflects between the neutral position and the deflected position; and (8) at least one second portion of conductive material extending to electrically connect the at least one first portion of conductive material to the electronic circuitry.

Such a wall-plate system may also include one or more structures set forth above combined with one or more of: (1) the face plate further comprising a rectangular outer perimeter forming lengthwise and widthwise extremes of the face plate in the longitudinal and lateral directions, respectively; (2) the at least one spring clip comprising a first spring clip and a second spring clip; (3) the at least one insulator comprising a first insulator and a second insulator; (4) the first spring clip being positioned outboard of the at least one outlet aperture and inboard of the first insulator in the lateral direction; (5) the second spring clip being positioned outboard of the at least one outlet aperture and inboard of the second insulator; and (6) the first and second spring clips being spaced from one another in the lateral direction and located on opposite sides of the at least one outlet aperture.

In a sixth exemplary embodiment, a wall-plate system may extend in longitudinal, lateral, and transverse directions that are orthogonal to one another and may include one or more structures set forth above combined with one or more of: (1) a face plate comprising a front, a back, at least one outlet aperture extending therethrough in the transverse direction, and a rectangular outer perimeter, wherein the rectangular outer perimeter forms lengthwise and widthwise extremes of the wall-plate system in the longitudinal and lateral directions, respectively; (2) the face plate further comprising an edge and at least one light aperture, wherein the edge extends in the lateral direction to form one lengthwise extreme of the wall-plate system and the at least one light aperture extends in the longitudinal direction through the edge; (3) a back plate abutting the back of the face plate; (4) electronic circuitry comprising at least one light source positioned proximate the at least one light aperture; (5) first and second spring clips, each connecting to the face plate, extending rearward away from the back of the face plate in the transverse direction, and comprising a portion of conductive material extending rearward away from the back of the face plate in the transverse direction; (6) the first and second spring clips each resiliently deflecting between a neutral position and a deflected position located outboard the neutral position in the lateral direction; (7) first and second insulators positioned outboard of the portion of conductive material of the first and second spring clips, respectively, in the lateral direction; (8) the first and second insulators respectively tracking the first and second spring clips as the first and second spring clips deflect between respective neutral and deflected positions; and (9) first and second lengths of conductive material sandwiched between the face plate and the back plate and extending to respectively electrically connect (a) the portion of conductive material corresponding to the first spring clip to the electronic circuitry and (b) the portion of conductive material corresponding to the second spring clip to the electronic circuitry.

Such a wall-plate system may also include one or more structures set forth above combined with one or more of: (1) the back of the face plate comprising at least one post extending rearward in the transverse direction; (2) the back plate comprising at least one first aperture extending in the transverse direction therethrough; (3) the base portion of the at least one spring clip comprising at least one second extending in the transverse direction therethrough; and (4) a post of the at least one post extending in the transverse direction through the at least one first aperture and the at least one second aperture to secure the face plate, back plate, and at least one spring clip together.

In a seventh exemplary embodiment, a system in accordance with the present invention may comprise a cover plate including one or more of the following structures: (1) a face plate comprising at least one outlet aperture; (2) a back plate abutting a back of the face plate; (3) an electric load between the face plate and the back plate; (4) at least one prong that extends from the face plate to a free end, the prong configured to interface with a terminal on a side of an outlet receptacle body, the prong comprising one or more of (a) an insulated portion and (b) an electrical contact, wherein the prong resiliently deflects outward when interfacing with a terminal, and wherein the prong deflects with a first resistance prior to contacting a wall, and a second resistance that is greater than the first resistance when the prong contacts the wall; and (5) at least one conductor electrically connecting the prong to the electric load.

Such a cover plate may also include one or more structures set forth above combined with one or more of: (1) the second resistance limiting further deformation of the prong; (2) the wall comprising an interior wall of an electrical receptacle box; (3) the wall being coupled directly to and extends from the back plate; (4) the wall being shorter than the prong; (5) the wall being wider than the prong; (6) contact with the wall increasing contact pressure between the prong and a terminal; (7) the at least one outlet aperture being shaped to admit a face of a duplex outlet therethrough; (8) the at least one outlet aperture being shaped to admit a face of a décor outlet therethrough; (9) the prong being configured to interface with a screw terminal; and (10) the face plate further comprising a subset of posts, and wherein the prongs and the back plate fit over the posts to retain the prong between the face plate and the back plate.

In an eighth exemplary embodiment, a system in accordance with the present invention may comprise a cover plate including one or more of the following structures: (1) a face plate comprising at least one outlet aperture; (2) electronic circuitry; (3) a pair of prongs coupled to the face plate, the pair of prongs comprising a first prong extending to a first free end and a second prong extending to a second free end, the prongs located on opposite sides of the at least one outlet aperture, each prong comprising one or more of (a) a conductive portion and (b) a non-conductive portion comprising a ramp located at the free end of the prong, wherein the prong resiliently deflects outward when interfacing with a terminal on the side of an outlet receptacle body and the ramp is configured to prevent the conductive portion from contacting a wall of an electrical box; and (4) at least one conductor electrically connecting the pair of prongs to electronic circuitry.

Such a cover plate may also include one or more structures set forth above combined with one or more of: (1) each prong further comprising a portion that extends inward toward the outlet aperture; (2) each prong further comprising the ramp is angled away from the outlet aperture; (3) the ramp being further configured to contact an interior wall of the electrical box; (4) the prongs being configured to interface with opposing screw terminals of an outlet receptacle body; (5) an insulated cover shielding the conductive portion; (6) the insulating cover comprising an aperture; (7) the conductive portion of each prong comprising an electrical contact that extends through the aperture of the insulated cover; (8) insulating tabs extending from the cover plate; (9) the insulating tabs being shorter than the prongs; (10) the ramp of each prong extending over one of the insulating tabs; (11) the insulating tabs being integrally molded components of the cover plate; (12) the insulating tabs comprising a hinged connection with the cover plate; and (13) the electronic circuitry comprising a light and a light sensor.

In a ninth exemplary embodiment, a system in accordance with the present invention may comprise a cover plate including one or more of the following structures: (1) a face plate comprising at least one outlet aperture; (2) at least one prong coupled to the face plate and extending from the faceplate to a free end, the prong configured to electrically couple to a terminal on the side of an outlet receptacle body, the prong comprising a conductive portion and a non-conductive portion; and (3) a tab located between the prong and an exterior edge of the face plate, the tab shielding an exterior side of the conductive portion of the prong.

Such a cover plate may also include one or more structures set forth above combined with one or more of: (1) the tab comprising sidewalls that extend toward the prong; (2) the non-conductive portion of the prong being formed from a resilient polymer; (3) the tab being a free standing structure; (4) the tab preventing the conductive portion from physical contact with conductors located outboard from the prong; (5) the tab preventing the conductive portion from arcing between the conductive portion and conductors located outboard from the prong; (6) the tab being flexible; and (7) the non-conductive portion of the prong comprising a ramp configured to extend over the tab to prevent the tab from touching an electrical receptacle box.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A cover plate comprising: a face plate comprising at least one outlet aperture; a back plate abutting a back of the face plate; an electric load between the face plate and the back plate; at least one prong that extends from the face plate to a free end, the prong configured to interface with a terminal on a side of an outlet receptacle body, the prong comprising: an insulated portion; and an electrical contact; wherein the free end of the prong comprises the insulated portion and wherein the prong resiliently deflects outward when interfacing with the terminal, and wherein the prong deflects with a first resistance prior to the insulated portion contacting a wall, and a second resistance that is greater than the first resistance when the insulated portion contacts the wall, wherein the wall comprises an interior wall of an electrical receptacle box; and at least one conductor electrically connecting the prong to the electric load.

2. The cover plate of claim 1, wherein the second resistance limits further deformation of the prong.

3. The cover plate of claim 1, wherein contact with the wall increases contact pressure between the prong and the terminal.

4. The cover plate of claim 1, wherein the at least one outlet aperture is shaped to admit a face of a duplex outlet therethrough.

5. The cover plate of claim 1, wherein the at least one outlet aperture is shaped to admit a face of a décor outlet therethrough.

6. The cover plate of claim 1, wherein the prong is configured to interface with a screw terminal.

7. The cover plate of claim 1, wherein the face plate further comprises a subset of posts, and wherein the prongs and the back plate fit over the posts to retain the prong between the face plate and the back plate.

8. A cover plate comprising: a face plate comprising at least one outlet aperture; electronic circuitry; a pair of prongs coupled to the face plate, the pair of prongs comprising a first prong extending to a first free end and a second prong extending to a second free end, the prongs located on opposite sides of the at least one outlet aperture, each prong comprising: a conductive portion, and a non-conductive portion comprising a ramp located at the free end of the prong, wherein the prong is configured to resiliently deflect outward when interfacing with a terminal on the side of an outlet receptacle body and the ramp is configured to prevent the conductive portion from contacting a wall of an electrical box; insulating tabs comprising a first insulating tab extending from the cover plate and positioned between the first prong and an edge of the face plate and a second insulating tab extending from the cover plate and positioned between the second prong and an edge of the face plate, wherein the insulating tabs comprise a hinged connection with the cover plate; and at least one conductor electrically connecting the pair of prongs to electronic circuitry.

9. The cover plate of claim 8, wherein each prong further comprises a portion that extends inward toward the outlet aperture.

10. The cover plate of claim 8, wherein each prong further comprises the ramp is angled away from the outlet aperture.

11. The cover plate of claim 8, wherein the ramp is further configured to contact an interior wall of the electrical box.

12. The cover plate of claim 8, wherein the prongs are configured to interface with opposing screw terminals of an outlet receptacle body.

13. The cover plate of claim 8, further comprising:
an insulated cover shielding the conductive portion, the insulating cover comprising an aperture; and
the conductive portion of each prong comprising an electrical contact that extends through the aperture of the insulated cover.

14. The cover plate of claim 8, wherein the insulating tabs are shorter than the prongs.

15. The cover plate of claim 14, wherein the ramp of each prong extends over one of the insulating tabs.

16. The cover plate of claim 8, wherein the insulating tabs are integrally molded components of the cover plate.

17. The cover plate of claim 8, wherein the electronic circuitry comprises a light and a light sensor.

18. A cover plate comprising: a face plate comprising at least one outlet aperture; at least one prong coupled to the face plate and extending from the faceplate to a free end, the prong configured to electrically couple to a terminal on the side of an outlet receptacle body, the prong comprising a conductive portion and a non-conductive portion; and a tab located between the prong and an exterior edge of the face plate, the tab shielding an exterior side of the conductive portion of the prong; wherein the non-conductive portion of the prong comprises a ramp configured to extend over the tab.

19. The cover plate of claim 18, wherein: the tab comprises sidewalls that extend toward the prong; and the non-conductive portion of the prong is formed from a resilient polymer.

20. The cover plate of claim 18, wherein the tab is a free standing structure.

21. The cover plate of claim 18, wherein the tab prevents the conductive portion from physical contact with conductors located outboard from the prong.

22. The cover plate of claim 18, wherein the tab prevents the conductive portion from arcing between the conductive portion and conductors located outboard from the prong.

23. The cover plate of claim 18, wherein the tab is flexible.

* * * * *